United States Patent
Jung et al.

(10) Patent No.: US 9,713,069 B2
(45) Date of Patent: Jul. 18, 2017

(54) METHOD FOR STEERING TRAFFIC IN WIRELESS COMMUNICATIONS SYSTEM AND APPARATUS FOR SUPPORTING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/764,864

(22) PCT Filed: Feb. 3, 2014

(86) PCT No.: PCT/KR2014/000918
§ 371 (c)(1),
(2) Date: Jul. 30, 2015

(87) PCT Pub. No.: WO2014/119968
PCT Pub. Date: Aug. 7, 2014

(65) Prior Publication Data
US 2016/0007268 A1    Jan. 7, 2016

Related U.S. Application Data

(60) Provisional application No. 61/758,778, filed on Jan. 31, 2013, provisional application No. 61/804,216, filed on Mar. 22, 2013.

(51) Int. Cl.
*H04W 48/08* (2009.01)
*H04W 48/06* (2009.01)
(Continued)

(52) U.S. Cl.
CPC .......... *H04W 48/08* (2013.01); *H04W 48/06* (2013.01); *H04W 48/18* (2013.01); *H04W 48/02* (2013.01);
(Continued)

(58) Field of Classification Search
CPC ..... H04W 84/12; H04W 48/18; H04W 88/06; H04W 36/22; H04W 28/08; H04W 36/14; H04W 48/16
See application file for complete search history.

(56) References Cited

U.S. PATENT DOCUMENTS

2012/0309447 A1   12/2012  Mustajarvi et al.
2013/0142042 A1*   6/2013  Garcia Martin .... H04L 12/5692
                                                      370/230

(Continued)

FOREIGN PATENT DOCUMENTS

EP          2437558 A1     4/2012
KR   10-2008-0098407 A    11/2008
(Continued)

OTHER PUBLICATIONS

Alcatel-Lucent, "Policy based terminal triggered, ANDSF decided access selection," 3GPP TSG SA WG2 Architecture—S2#63, SA WG2 Temporary Document, S2-081658, Athens, Greece, Feb. 18-22, 2008, pp. 1-6, XP050263998.
(Continued)

*Primary Examiner* — Jung Park
(74) *Attorney, Agent, or Firm* — Birch, Stewart, Kolasch & Birch, LLP

(57) ABSTRACT

Disclosed is a method for enabling user equipment (UE) to steer traffic in a wireless communications system. The method comprises the steps of: transmitting UE traffic steering preference information to a first access network; receiving traffic steering information from the first access
(Continued)

network, the traffic steering information being set based on the UE traffic steering preference information; evaluating the traffic steering based on at least one of a first and a second traffic steering rule; and performing the traffic steering between the first access network and a second access network based on the result of the evaluation of the traffic steering. The first traffic steering rule is prescribed by ANDSF (Access Network Discovery and Selection Functions). The second traffic steering rule is prescribed by the first access network.

9 Claims, 20 Drawing Sheets

(51) Int. Cl.
- *H04W 48/18* (2009.01)
- *H04W 48/02* (2009.01)
- *H04W 84/04* (2009.01)
- *H04W 84/12* (2009.01)
- *H04W 88/06* (2009.01)

(52) U.S. Cl.
CPC .......... *H04W 84/042* (2013.01); *H04W 84/12* (2013.01); *H04W 88/06* (2013.01)

(56) References Cited

U.S. PATENT DOCUMENTS

| | | | | |
|---|---|---|---|---|
| 2014/0106743 A1* | 4/2014 | Ferraro Esparza | ... | H04W 48/08 455/426.1 |
| 2014/0162629 A1* | 6/2014 | Tipton | ................. | H04W 24/02 455/423 |
| 2014/0185524 A1* | 7/2014 | Kekki | .................. | H04W 40/02 370/328 |
| 2015/0327153 A1* | 11/2015 | Tervonen | .............. | H04W 48/08 370/235 |

FOREIGN PATENT DOCUMENTS

| | | |
|---|---|---|
| KR | 10-2010-0021647 A | 2/2010 |
| KR | 10-2011-0044239 A | 4/2011 |
| WO | WO 2007/092788 A2 | 8/2007 |
| WO | WO 2008/157449 A1 | 12/2008 |
| WO | WO 2009/095336 A1 | 8/2009 |
| WO | WO 2010/008651 A1 | 1/2010 |
| WO | WO 2012/149954 A1 | 11/2012 |

OTHER PUBLICATIONS

Huawei et al., "Solutions for Interaction between WLAN network selection and network-provided policies for WLAN selection," SA WG2 Meeting #95, SA WG2 Temporary Document, S2-130125, Prague, CZ, Jan. 28-Feb. 1, 2013, 15 pages, XP050684958.

\* cited by examiner

METHOD FOR STEERING TRAFFIC IN WIRELESS COMMUNICATIONS SYSTEM AND APPARATUS FOR SUPPORTING SAME

CROSS REFERENCE TO RELATED APPLICATIONS

This application is the National Phase of PCT International Application No. PCT/KR2014/000918, filed on Feb. 3, 2014, which claims priority under 35U.S.C. 119(e) to U.S. Provisional Application Nos. 61/758,778 filed on Jan. 31, 2013 and 61/804,216 filed on Mar. 22, 2013, all of which are hereby expressly incorporated by reference into the present application.

BACKGROUND OF THE INVENTION

Field of the Invention

The present invention relates to wireless communication and, more particularly, to a method for steering traffic in a wireless communication system and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A wireless communication system may provide a service to a terminal through a plurality of access networks. The terminal may receive a service from a 3GPP access network such as a mobile wireless communication system. Further, the terminal may receive the service from a non-3GPP access network such as WiMAX (Worldwide Interoperability for Microwave Access) or a WLAN (Wireless Local Area Network).

Generally, the terminal may establish connection with a 3GPP access network to receive the service. Meanwhile, when traffic overload is generated in a 3GPP access network, if traffic to be processed by the terminal is processed by another access network, that is, the non-3GPP access network, the whole efficiency of the network may be improved. As described above, changeable process of the traffic through the 3GPP access network and/or the non-GPP access network refers to traffic steering so that the traffic is changeably processed through a 3GPP access network and/ or a non-GPP access network.

For the traffic steering, a policy for interworking of the 3GPP access network and/or the non-GPP access network such as ANDSF (Access Network Discovery and Selection Functions) may be configured in the terminal. The above policy is managed independently from an interworking policy configured by the network.

When at least one interworking policy is configured, the terminal takes into consideration at least two traffic steering rules for traffic steering, which may cause collision between the rules. Accordingly, the terminal cannot normally perform traffic steering, so that traffic is inefficiently processed or is not processed. Accordingly, the present invention suggests a method capable of handling at least two traffic steering rules to perform traffic steering when the at least two traffic steering rules are provided to the terminal.

SUMMARY OF THE INVENTION

The present invention provides a method for steering traffic in a wireless communication system and an apparatus for supporting the same.

In an aspect, provided is a method for enabling a user equipment (UE) to steer traffic in a wireless communication system. The method includes transmitting UE traffic steering preference information to a first access network, receiving traffic steering information from the first access network, the traffic steering information being set based on the UE traffic steering preference information, evaluating the traffic steering based on at least one of a first and a second traffic steering rule and performing the traffic steering between the first access network and a second access network based on the result of the evaluation of the traffic steering. The first traffic steering rule is prescribed by access network discovery and selection functions (ANDSF), and the second traffic steering rule is prescribed by the first access network.

The UE traffic steering preference information may indicate that the UE prefers the first traffic steering rule to the second traffic steering rule or prefers the second traffic steering rule to the first traffic steering rule.

When the UE traffic steering preference information may indicate that the UE prefers the second traffic steering rule to the first traffic steering rule, the UE traffic steering preference information is configured to include the first traffic steering rule.

The method may further comprise performing measurement with respect to the first access network and the second access network when the UE traffic steering preference information indicates that the UE prefers the second traffic steering rule to the first traffic steering rule, performing of the traffic steering is performed based on the measurement result and the second traffic steering rule.

The method may further comprise configuring the first traffic steering rule.

When the UE traffic steering preference information may indicate that the UE prefers the first traffic steering rule to the second traffic steering rule and the ANDSF is an enhanced ANDSF comprising at least one ANDSF management object (MO), the traffic steering information is configured to include the second traffic steering rule.

The method may further comprise updating the first traffic steering rule based on the at least rule parameter when at least one rule parameter associated with the second traffic steering rule corresponds to the at least one ANDSF MO.

The method may further comprise performing measurement with respect to the first access network and the second access network to acquire a measurement result, the evaluating of the traffic steering is performed based on the measurement result and the updated first traffic steering rule.

When the UE traffic steering preference information may indicate that the UE prefers the first traffic steering rule to the second traffic steering rule and the ANDSF is a legacy ANDSF comprising at least one ANDSF management object (MO), the traffic steering information is configured not to comprise the second traffic steering rule.

When the UE traffic steering preference information may indicate that the UE prefers the first traffic steering rule to the second traffic steering rule and the ANDSF is a legacy ANDSF which does not comprise the at least one ANDSF management object (MO), the evaluating of the traffic steering is performed based on the first traffic steering rule.

The first access network may be a long term evolution (LTE) based access network, and the second access network may be a wireless local area network (WLAN) based access network.

In another aspect, provided is a wireless apparatus operating in a wireless communication system. The wireless apparatus comprise a Radio Frequency (RF) unit that sends and receives radio signals and a processor that is functionally coupled to the RF unit. The processor is configured to transmit UE traffic steering preference information to a first access network, receive traffic steering information from the first access network, the traffic steering information being set based on the UE traffic steering preference information, evaluate the traffic steering based on at least one of a first and a second traffic steering rule and perform the traffic steering between the first access network and a second access network based on the result of the evaluation of the traffic steering. The first traffic steering rule is prescribed by access network discovery and selection functions (ANDSF), and the second traffic steering rule is prescribed by the first access network.

In accordance with a method for steering traffic according to the present invention, the UE transmits preference information on traffic steering to the 3GPP access network so that an interworking policy suitable for the UE may be configured. The terminal performs traffic steering through the interworking policy in which the preference of the UE is reflected, and may efficiently process the traffic. In addition, irreconcilable interworking policy (or traffic steering rule) is prevented from being configured in the UE so that a traffic process rate and reliability may be improved.

DESCRIPTION OF EXEMPLARY EMBODIMENTS

Figure 1:
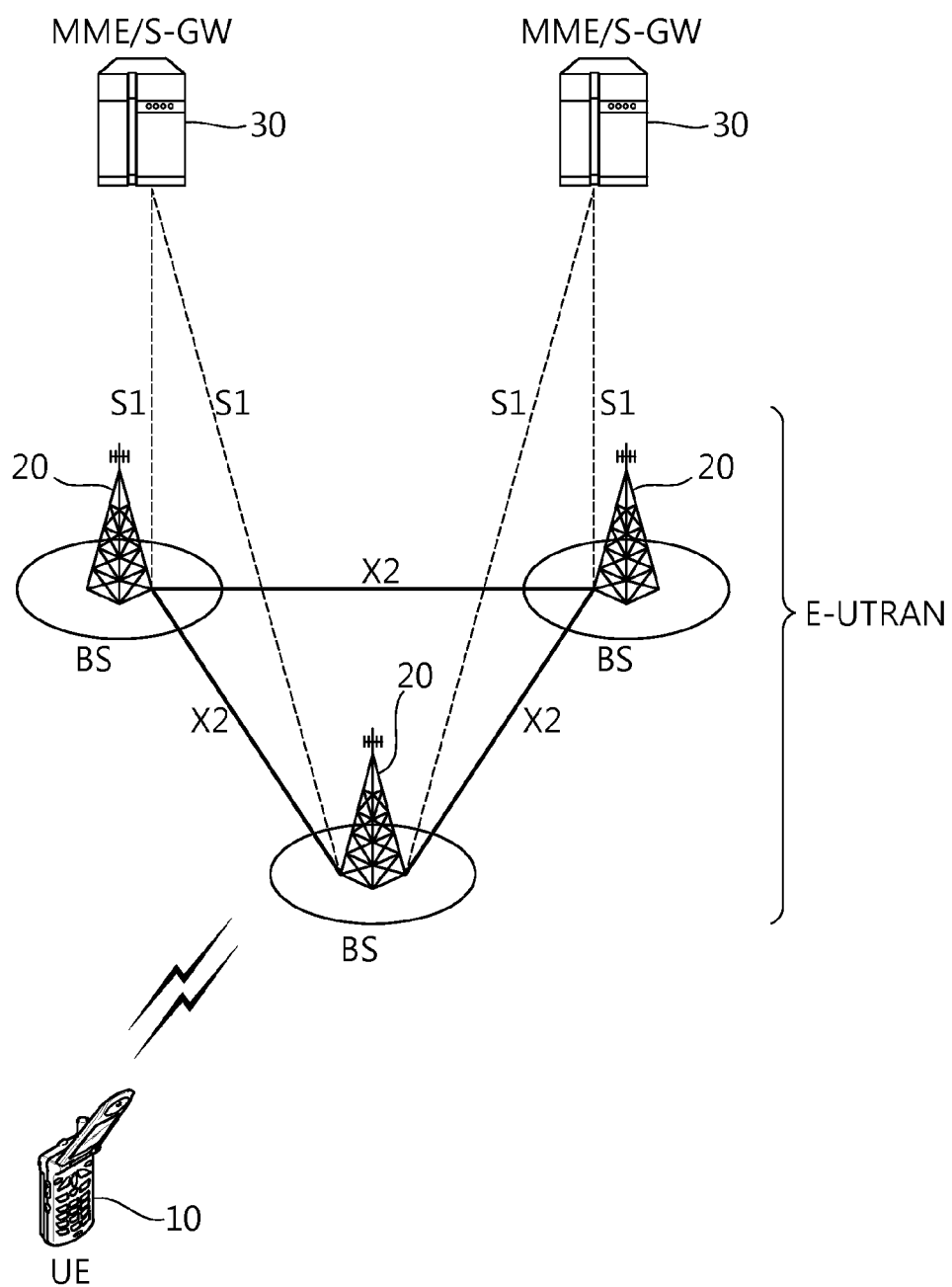
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
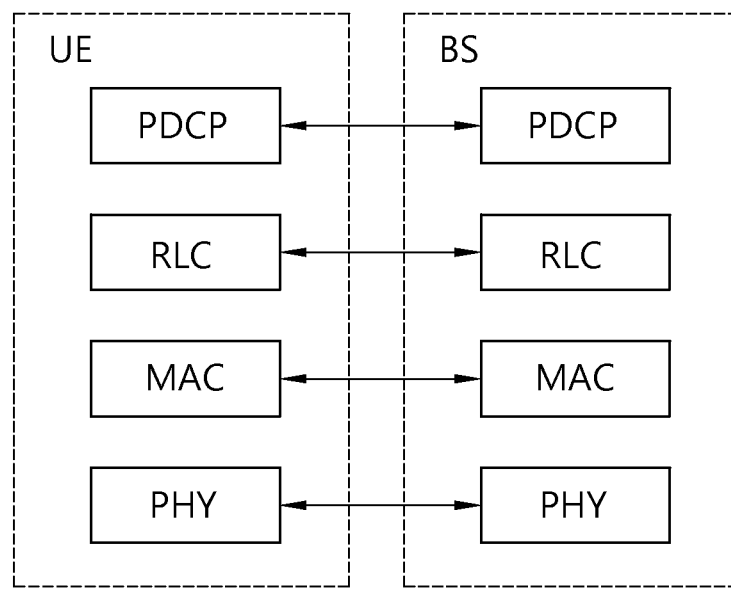
FIG. 2 is a block diagram showing the structure of a wireless protocol on the user plane.
Figure 3:
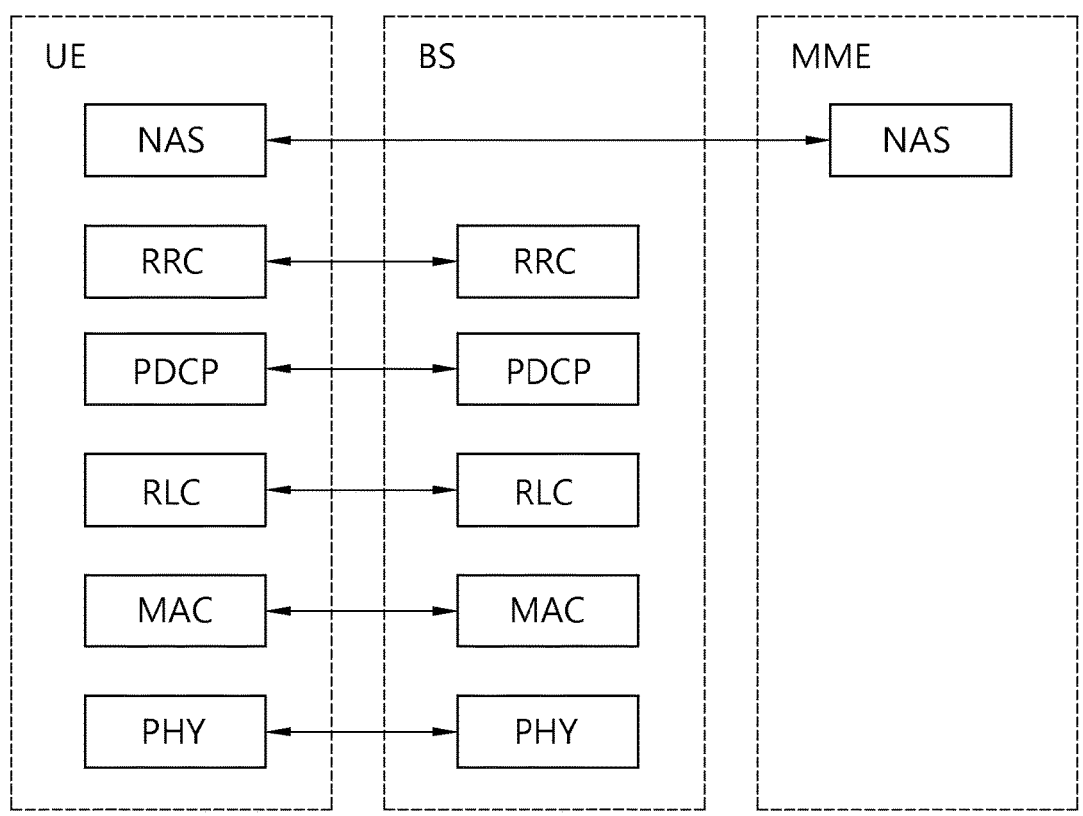
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, a physical channel in a 3GPP LTE may be divided into a PDSCH (Physical Downlink Shared Channel) and a PUSCH (Physical Uplink Shared Channel) being a data channel and a PDCCH (Physical Downlink Control Channel), a PCFICH (Physical Control Format Indicator Channel), a PHICH (Physical Hybrid-ARQ Indicator Channel), and a PUCCH (Physical Uplink Control Channel) being a control channel.

A PCFICH transmitted through a first OFDM symbol of a sub-frame carries a CFI (control format indicator) with respect to the number of OFDM symbols used to transmit control channels in a sub-frame. The terminal firstly receives a CFI on a PCFICH to monitor the PDCCH.

The PDCCH refers to a scheduling channel to carry schedule information as a downlink control channel. The control information transmitted through the PDCCH refers to downlink control information (DCI). The DCI may include resource allocation of the PDSCH (refers to DL grant (downlink grant)), resource allocation of the PUSCH (refers to uplink (UL) grant)), and a group and/or VoIP (Voice over Internet Protocol) of a transmission power control command with respect to individual UEs in an optional UE group.

In the 3GPP LTE, blind decoding is used to detect the PDCCH. The blind decoding de-masks a desired identifier to a CRC (Cyclic Redundancy Check) of a received PDCCH (refers to candidate PDCCH), and checks a CRC error to determine whether a corresponding PDCCH is a control channel thereof.

The base station determines a PDCCH format according to a DCI to be sent to the terminal to attach a CRC to the DCI, and masks a unique identifier (refers to RNTI (Radio Network Temporary Identifier)) according to an owner or a use of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a MIB (Master Information Block) and a plurality of SIBs (System Information Blocks).

The MIB may include a limited number of parameters which are most frequently transmitted and are required for acquisition for other information from a cell. The terminal firstly searches the MIB after downlink synchronization. The MIB may include information such as a downlink channel bandwidth, PHICH configuration, an SFN to support synchronization and to be operated as a timing reference, and eNB transmission antenna configuration. The MIB may be broadcasted on the BCH.

A SIB1 (SystemInformationBlockType1) among SIBs is transmitted while being included in a SystemInformationBlockType1", and other SIBs except for the SIB1 is transmitted while being included in the system information message. The SIBs may be flexibly mapped to the system information message according to a scheduling information list parameter included in the SIB1. However, each SIB is included in a single system information message, and only SIBs having the same scheduling required value (e.g. period) may be mapped to the same system information message. Further, a SIB2 (SystemInformationBlockType2) is mapped to a system information message corresponding to a first entry in a system information message list of a scheduling information list. A plurality of system information messages may be transmitted within the same time period. The SIB1 and all system information messages are transmitted on a DL-SCH.

Further to broadcast transmission, the E-UTRAN may be dedicated-signaled in a state that the SIB1 includes the same parameter as a preconfiguration value. In this case, the SIB1 may be transmitted while being included in a RRC connection reconfiguration message.

The SIB1 includes information on terminal cell access, and defines scheduling of other SIBs. The SIB1 may include PLMN identifiers of a network, a TAC (Tracking Area Code), a cell ID, a cell barring status to indicate whether a cell may camp-on, the lowest reception level required in a cell used as a cell reselection reference, and information on a transmission time and a time period of other SIBs.

The SIB2 may include radio resource configuration information common in all terminals. The SIB2 may include a uplink carrier frequency, an uplink channel bandwidth, RACH configuration, paging configuration, uplink power control configuration, sounding reference signal configuration, ACK/NACK 전송을 지원하는 PUCCH configuration and PUSCH configuration supporting ACK/NACK transmission.

The terminal may apply acquisition and change sensing procedures of system information with respect to only a PCell. In the SCell, the E-UTRAN may provide all system information on the RRC connection state operation through dedicated signaling when a corresponding SCell is added. When system information on the configured SCell is changed, the E-UTRAN may release a considered SCell and may add the considered SCell later, which may be performed together with a single RRC connection reconfiguration message. The E-UTRAN may configure parameter values different from a value broadcasted in the considered SCell through the dedicated signaling.

The terminal should ensure validity with respect to system information of a specific type. The above system information refers to required system information. The required system information may be defined as follows.

When the terminal is in a RRC idle state: the terminal should to have a valid version of an MIB and the SIB1 as well as a SIB2 to a SIB8, which may depend on support of a considered RAT.

When the terminal is in a RRC connection state: the terminal should ensure to have valid versions of the MIB, the SIB1 and the SIB2.

In general, after the system information is acquired, validity may be ensured with a maximum three hours.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
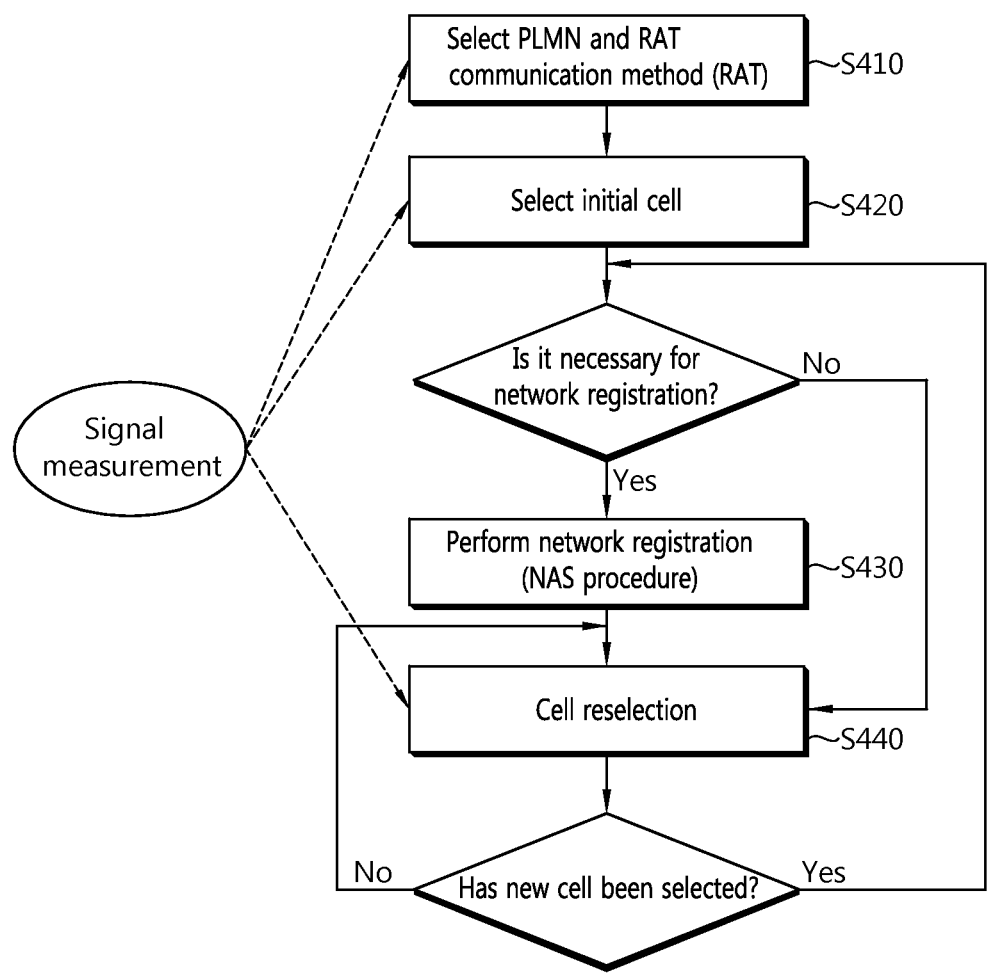
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
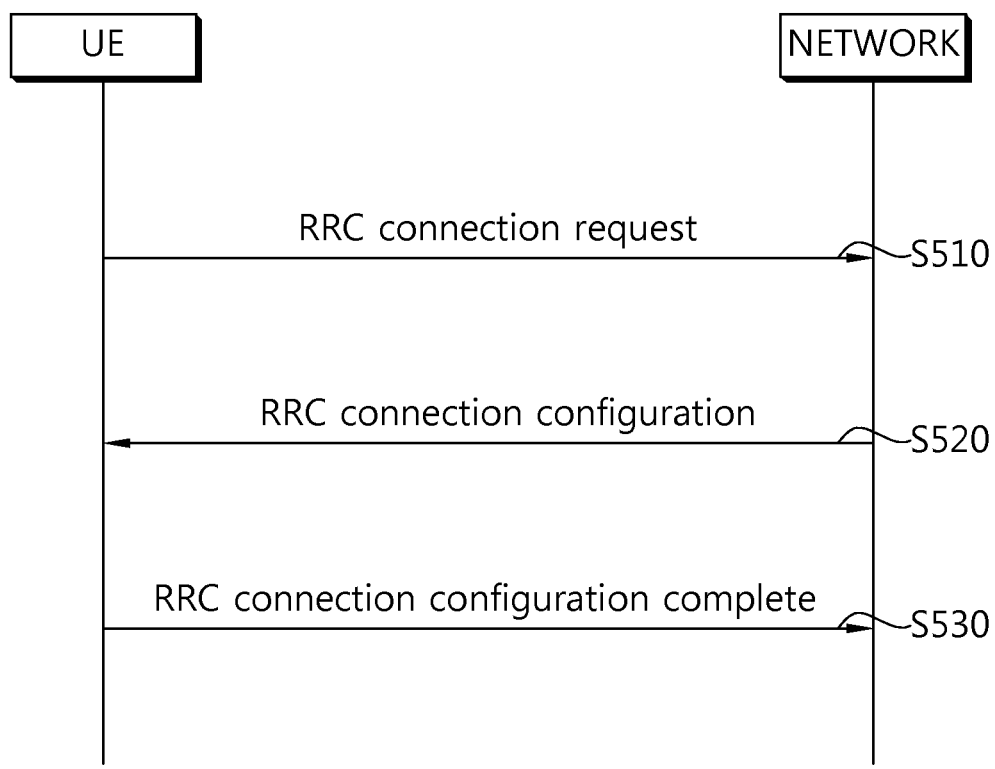
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
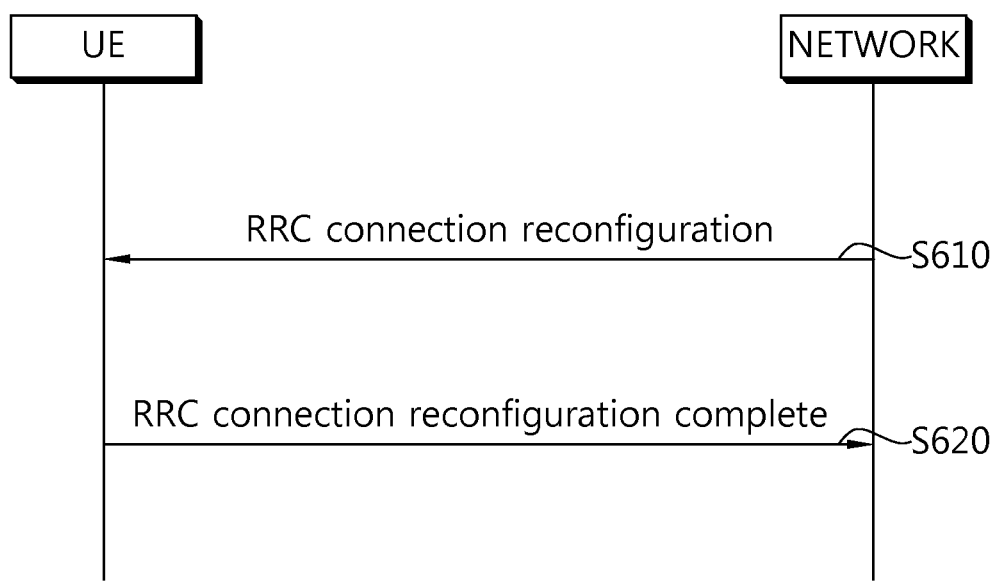
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection reference may be defined as expressed by a following equation 1.

$$Srxlev>0 \text{ AND } Squal>0 \quad \text{[Equation 1]}$$

where:
$Srxlev=Q_{rxlevmeas}-(Q_{rxlevmin}+Q_{rxlevminoffset})-Pcompensation$
$Squal=Q_{qualmeas}-(Q_{qualmin}+Q_{qualminoffset})$ In this case, respective variables of the equation 1 may be defined by a following table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signaled values Qrxlevminoffset and Qqualminoffset are a result of periodic search with respect to a PLMN of a higher priority while the terminal camps on a normal cell in the VPLMN. During the periodic search with the PLMN having the higher priority, the terminal may perform cell selection estimation using stored parameters from other cell of the PLMN having the higher priority.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, \quad R_n = Q_{meas,s} - Q_{offset} \qquad \text{[Equation 1]}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not receive $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_S$ of a serving cell and $R_n$ of a neighbor cell according to the above equation, considers a cell having the greatest ranking criterion value to be the highest-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

In order to perform the cell reselection according to the cell reselection estimation, when the cell reselection reference is satisfied for a specific time, the terminal determines that the cell reselection reference is satisfied and may perform cell movement to a selected target cell. In this case, the specific time may be given from the network as a Treselection parameter. The Treselection may specify a cell reselection timer value, and may be defined with respect to each frequency of the E-UTRAN and other RAT.

Hereinafter, cell reselection information used for cell reselection of the terminal will be described.

The cell reselection information is a type of a cell reselection parameter and may be transmitted and provided to the terminal while being included in the system information broadcasted from the network. The cell reselection parameter provided to the terminal may include following types.

Cell reselection priority cellReselectionPriority: The cellReselectionPriority parameter specifies a priority with respect to a frequency of the E-UTRAN, a frequency of a UTRAN, a group of GERAN frequencies, a band glass of a CDMA2000 HRPD or a band glass of a CDMA2000 1×RTT.

$Q\text{offset}_{s,n}$: specifies an offset value between two cells.

$Q\text{offset}_{frequency}$: specifies frequency specific offset with respect to an E-UTRAN frequency having the same priority.

$Q_{hyst}$: specifies a hysteresis value with respect a rank index.

$Q_{qualmin}$: specifies a required minimum quality level in a dB unit.

$Q_{rxlevmin}$: specifies a required minimum Rx in a dB unit.

$\text{Treselection}_{EUTRA}$: may specify a cell reselection timer value for the E-UTRAN, and may be configured with respect to each frequency of the E-UTRAN.

$\text{Treselection}_{UTRAN}$: specifies a cell reselection timer value for the UTRAN.

$\text{Treselection}_{GERA}$: specifies a cell reselection timer value for the GERAN.

$\text{Treselection}_{CDMA\_HRPD}$: specifies a cell reselection timer value for CDMA HRPD.

$\text{Treselection}_{CDMA\_1 \times RTT}$: specifies a cell reselection timer value for CDMA 1×RTT.

$\text{Thresh}_{x, HighP}$: specifies a Srxlev threshold value used by a terminal upon cell reselection to an RAT/frequency having a priority higher than a serving frequency. A specific threshold value may be independently configured with respect to each frequency of the E-UTRAN and the UTRAN, each group of a GERAN frequency, each band glass of CDMA2000 HRPD and each band glass of CDMA2000 1×RTT.

$Thresh_{x,\ HighQ}$: When cell reselection to RAT/frequency having a priority higher than the serving frequency is performed, a Squal threshold value used by a terminal is specified in a dB unit. The specific threshold value may be independently configured with respect to each frequency of the E-UTRAN and a UTRAN FDD.

$Thresh_{x,\ LowP}$: When cell reselection to RAT/frequency having a priority lower than the serving frequency is performed, a Srxlev threshold value used by a terminal is specified in a dB unit. The specific threshold value may be independently configured with respect to each frequency of the E-UTRAN and a UTRAN FDD, each group of a GERAN frequency, each band glass of a CDMA2000 HRPD and each band glass of CDMA2000 1×RTT.

$Thresh_{x,\ LowQ}$: When cell reselection to RAT/frequency having a priority lower than the serving frequency is performed, a Squal threshold value used by a terminal is specified in a dB unit. The specific threshold value may be independently configured with respect to each frequency of the E-UTRAN and a UTRAN FDD.

$Thresh_{Serving,\ LowP}$: When cell reselection to RAT/frequency having a priority lower than the serving frequency is performed, a Srxlev threshold value used by a terminal is specified in a dB unit.

$Thresh_{Serving,\ LowQ}$: When cell reselection to RAT/frequency having a priority lower than the serving frequency is performed, a Squal threshold value used by a terminal is specified in a dB unit.

$S_{IntraSerachP}$: specifies a Srxlev threshold value with respect to intra-frequency measurement in a dB unit.

$S_{IntraSerachQ}$: specifies a Squal threshold value with respect to intra-frequency measurement in a dB unit.

$S_{nonIntraSerachP}$: specifies E-UTRAN inter-frequency and a Srxlev threshold value with respect to inter-RAT measurement.

$S_{nonIntraSerachQ}$: specifies E-UTRAN inter-frequency and a Squal threshold value with respect to E-UTRAN inter-frequency and inter-RAT measurement.

Meanwhile, the cell reselection information may be provided while being included in a RRC connection release message which is a RRC message transmitted for RRC connection release between the network and the terminal. For example, the RRC connection release message may include a sub-carrier frequency list and cell reselection priority of the E-UTRAN, a sub-carrier frequency list and cell reselection priority of the UTRA-FDD, a sub-carrier frequency list and cell reselection priority of the UTRA-TDD, a sub-carrier frequency list and cell reselection priority of the GERAN, a band glass list and cell reselection priority of the CDMA2000 HRPD, and a band glass list and cell reselection priority of CDMA2000 1×RTT.

Hereinafter, RAN sharing by a plurality of businesses will be described.

A plurality of businesses may separately establish an RAN to provide the service, but shares a cell established by a specific business to provide the service to a subscriber. This refers to RAN sharing. In this case, the cell shared by a plurality of businesses may broadcast a PLMN list. The PLMN list may be transmitted while being included in SIB1 of broadcasted system information. Meanwhile, the PLMN list included in the SIB1 may be implemented so that the first listed PLMN identifier may indicate a primary PLMN.

Cell reselection information provided from a shared cell in a state that one cell is shared by a plurality of businesses may be commonly applicable to all PLMNs in a PLMN list. Generally, the cell reselection information provided from a shared cell is configured to be suited to a policy of a primary PLMN. Accordingly, terminals receiving a service according to a sub-PLMN perform cell reselection based on information different from optimized cell reselection information for providing the service.

Hereinafter, handover associated with movement of the terminal in a RRC connection state will be described.

Figure 7:
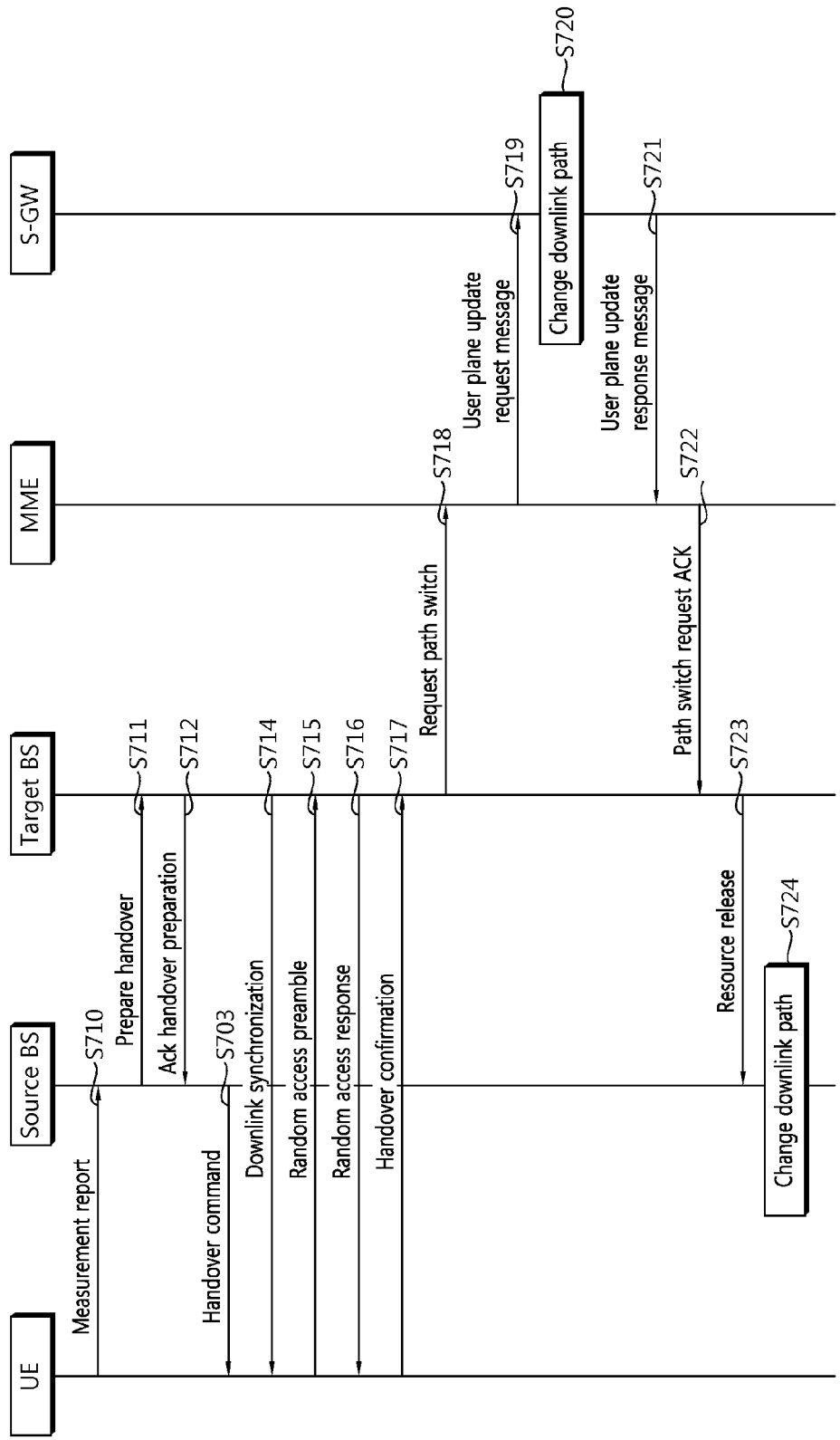
FIG. 7 is a flowchart illustrating a handover process.

FIG. 7 is a flowchart illustrating a handover process.

UE transmits a measurement report to a source BS (S710). The source base station determines presence of handover using a received measurement report. When the source base station determines handover to a neighboring cell, the base station included in a target cell becomes a target BS.

The source base station transmits a handover preparation message to the target base station (S711). The target base station performs admission control in order to increase success possibility of the handover.

The target base station transmits a handover preparation acknowledgement (ACK) message to the source base station (S712). The handover preparation acknowledgement (ACK) message may include a Cell-Radio Network Temporary Identifier (C-RNTI) and/or dedicated random access preamble. The C-RNTI presents an identifier for identifying a terminal in a cell. The dedicated random access preamble presents a preamble which may be exclusively used and is used to perform a non-contention-based random access process. The random access process may be divided into a contention-based process using an optional random access preamble and a non-contention-based process using a dedicated random access preamble. The non-contention-based process may prevent delay of handover due to contention with other terminal as compared with the contention-based process.

The source BS transmits a handover command message to the terminal (S713). The handover command message may be transmitted in the form of a radio resource control (RRC) connection reconfiguration message. The handover command message may include a C-RNTI and a dedicated random access preamble received from the target BS.

The terminal receives the handover command message from the source BS and then synchronizes with the target BS (S714). The terminal receives and synchronizes a PSS and a SSS with each other to acquire system information.

The terminal transmits the random access preamble to the target BS to start the random access preamble to start an access process (S715). The terminal may use the dedicated random access preamble included in the handover command message. Alternatively, if the dedicated random access preamble is not allocated, the terminal may use a random access preamble optionally selected from a radon access preamble group.

The target BS transmits the random access response message to the terminal (S716). The random access response message may include uplink resource allocation and/or timing advance.

If the terminal receives the random access response message, the terminal adjusts uplink synchronization based on timing offset, and transmits a handover confirmation message to the target BS using the uplink resource allocation (S717). The handover confirmation message may indicate that the handover process is terminated and may be transmitted together with an uplink buffer status report.

The target BS reports that a cell of the terminal is changed to a mobility management entity (MME) by transmitting a path switch request message to the MME (S718).

The MME transmits a user plane update request message to a serving-gateway (S-GW) (S719).

The S-GW switches the downlink data path to the target BS (S720).

The S-GW transmits a user plane update response message to the MME (S721).

The MME transmits a path switch request ACK to the target BS (S722).

The target BS transmits a resource release message to the source BS to report success of handover (S723).

The source BS releases a resource associated with the terminal (S724).

Hereinafter, radio link monitoring (RLM) will be described.

The terminal monitors downlink quality based on a cell-specific reference signal in order to detect downlink radio link quality of a PCell. The terminal estimates the downlink radio link quality for the purpose of monitoring downlink radio link quality of the PCell and compares the estimated downlink radio link quality with threshold values Qout and Qin. The threshold values Qout is defined as a level at which a downlink radio link may not be received, which corresponds to a 10% block error rate of hypothetical PDCCH transmission by taking into consideration a PDFICH error. The threshold value Qin is defined as a downlink radio link quality level which may be stable more than a level of the threshold value Qout, which corresponds to a 2% block error rate of hypothetical PDCCH transmission by taking into consideration the PCFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 8:
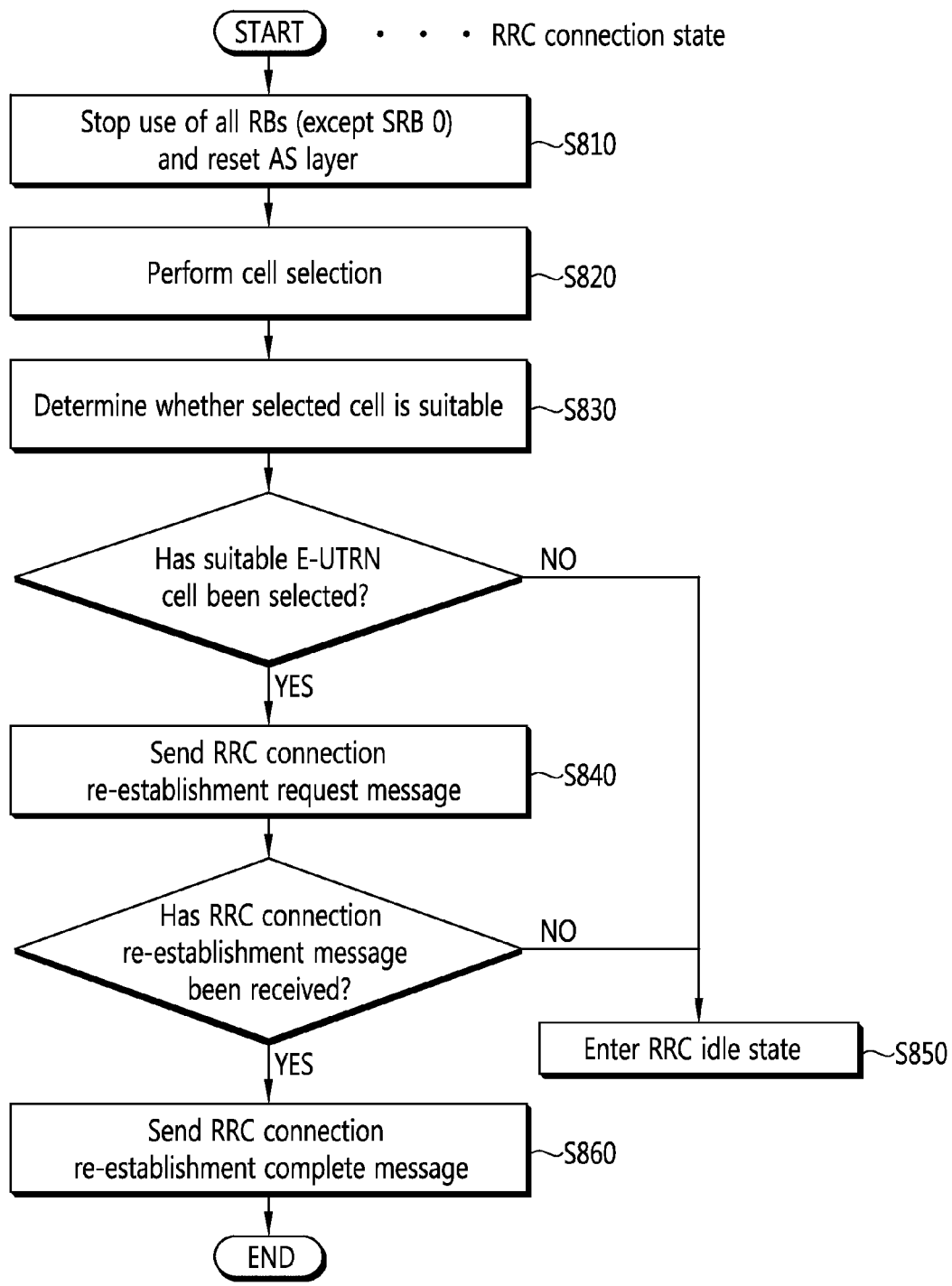
FIG. 8 is a diagram illustrating an RRC connection re-establishment procedure.

FIG. 8 is a diagram illustrating an RRC connection re-establishment procedure.

Referring to FIG. 8, UE stops using all the radio bearers that have been configured other than a Signaling Radio Bearer (SRB) #0, and initializes a variety of kinds of sublayers of an Access Stratum (AS) (S810). Furthermore, the UE configures each sublayer and the PHY layer as a default configuration. In this process, the UE maintains the RRC connection state.

The UE performs a cell selection procedure for performing an RRC connection reconfiguration procedure (S820). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S830). If the selected cell is determined to be a suitable E-UTRAN cell, the UE sends an RRC connection re-establishment request message to the corresponding cell (S840).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S850).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S860).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, measurement and measurement report will be described.

It is essential to support mobility of the terminal in the wireless communication system. Accordingly, the terminal continuously measures quality of the serving cell for providing a current service and quality of a neighboring cell. The terminal reports the measurement result to the network at a suitable time, and the network provides optimal mobility to the terminal through handover or the like. The measurement for the above purpose refers to radio resource management (RRM) measurement.

The terminal performs measurement of a specific purpose configured by the network to report the measurement result to the network in order to provide information which the business may aid to operate the network as well as for the purpose of supporting mobility. For example, the terminal receives broadcast information of a specific cell determined by the network. The terminal may report a cell identity (refers to a global cell identity), identity information on a location in which the specific cell is included (e.g., tracking area code) and/or other cell information (e.g., presence of a member of a Closed Subscriber Group (CSG)) to a serving cell.

When a moved terminal confirms that quality of a specific zone is very bad through measurement, the terminal may report location information and a measurement result with respect to cells having bad quality to the network. The network may optimize the network based on report of measurement results of terminals to aid the operation of the network.

In a mobile communication system having a 1 frequency reuse factor, mobility is mainly achieved between different cells at the same frequency band. Accordingly, in order to easily ensure mobility of the terminal, the terminal may easily measure quality and cell information of neighboring cells having the same center frequency as a center frequency of a serving cell. As described above, measurement with respect to a cell having the same center frequency as a center frequency of a serving cell refers to intra-frequency measurement. The terminal performs intra-frequency measurement to report the measurement result to the network at a suitable time so that a purpose of a corresponding measurement result is achieved.

A mobile communication company may operate the network using a plurality of frequency bands. When a service of a communication system is provided through a plurality of frequency bands, in order to ensure optimal mobility to the terminal, the terminal should easily measure quality and cell information of neighboring cells having a center frequency different from a center frequency of a serving cell. As described above, measurement with respect to the cell having a center frequency different from the center frequency of the serving cell refers to inter-frequency measurement. The terminal may perform the inter-frequency measurement to report the measurement result to the network at a suitable time.

When the terminal supports measurement with respect to the network based on other RAT, the terminal may measure a cell of a corresponding network by configuring a base station. Such measurement refers to an inter-radio access technology (RAT). For example, the RAT may include a UMTS Terrestrial Radio Access Network (UTRAN) and a GSM EDGE Radio Access Network (GERAN) depending on a 3GPP standard protocol, and may further include a CDMA 2000 system depending on a 3GPP2 standard protocol.

Figure 9:
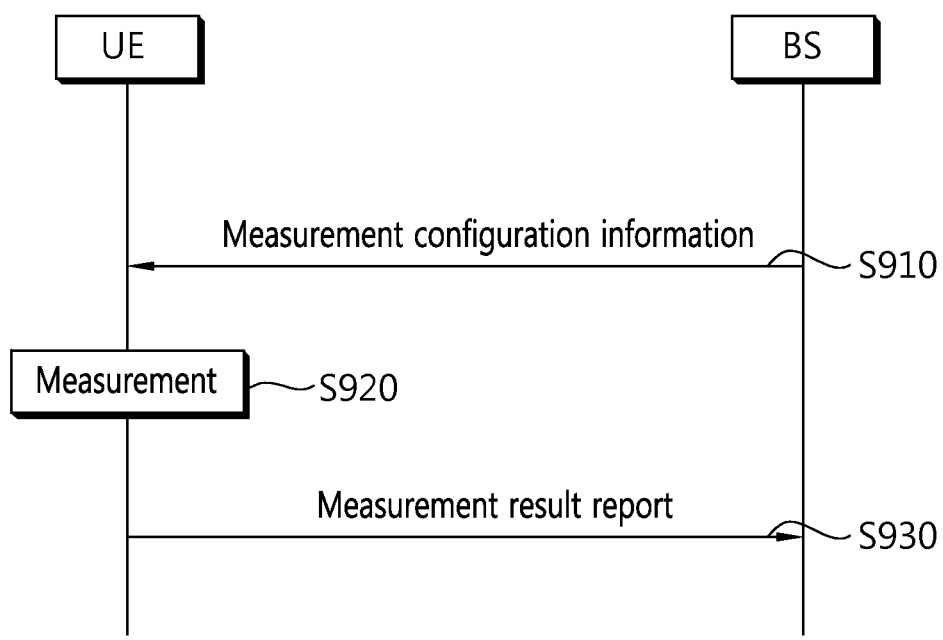
FIG. 9 is a flowchart illustrating a measuring method according to the related art.

FIG. 9 is a flowchart illustrating a measuring method according to the related art.

The terminal receives measurement configuration information from a base station (S910). A message including measurement configuration information refers to a measurement configuration message. The terminal performs measurement based on the measurement configuration information (S920). If the measurement result satisfies a report condition in the measurement configuration information, the terminal reports the measurement result to the base station. A message including the measurement result refers to a measurement report message.

The measurement configuration information may include following information.

(1) Measurement object information: represents information on an object to be measured by the terminal. The measurement object includes at least one of an intra-frequency measurement object being a measurement object in a cell, an inter-frequency measurement object being a measurement object between cells, and an inter-RAT measurement object being an inter-RAT measurement object. For example, the inter-frequency measurement object may indicate a neighboring cell having the same frequency band as that of the serving cell, the inter-frequency measurement object may indicate a neighboring cell having a frequency band different from that of the serving cell, and an inter-RAT measurement object may indicate a neighboring cell of a RAT different from that of the serving cell.

(2) Reporting configuration information: represents information on a reporting condition and a reporting type when transmission of the measurement result is reported. The reporting configuration information may be configured as a list of reporting configuration. Each reporting configuration may include a reporting criterion and a reporting format. The reporting criterion is a criterion triggering transmission of the measurement result by the terminal. The reporting criterion may include a period of a measurement reporting or a single event for the measurement reporting. The reporting format is information on which type the terminal configures the measurement result.

(3) Measurement identity information: represents information on a measurement identity to determine when the terminal reports a certain measurement object as a certain type by associating the measuring reporting with reporting configuration. The measurement identity information is included in the measurement reporting message, which may represent which measurement object is the measurement result and in which reporting condition the measurement reporting is generated.

(4) Quantity configuration information: represents information on a parameter for configuring filtering of a measurement unit, a reporting unit, and/or a measurement result value.

(5) Measurement gap information: represents information on a measurement gap which is an interval when the terminal may use for measurement without considering data transmission with the serving cell because downlink transmission or uplink transmission is not scheduled.

The terminal has a measurement object list, a measurement reporting configuration list, and a measurement identity list in order to perform a measurement procedure.

In the 3GPP LTE, the base station may configure only one measurement object with respect to one frequency band to the terminal. According to section 5.5.4 of 3GPP TS 36.331 V8.5.0 (2009-03) "Evolved Universal Terrestrial Radio Access (E-UTRA) Radio Resource Control (RRC); Protocol specification (Release 8)", events resulting in the measurement reporting as listed in a following table 2 are defined.

TABLE 2

| Events | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold) and inter RAT neighbour becomes better than threshold2 |

If the measurement result of the terminal satisfies the configured event, the terminal transmits a measurement reporting message to the base station.

Figure 10:
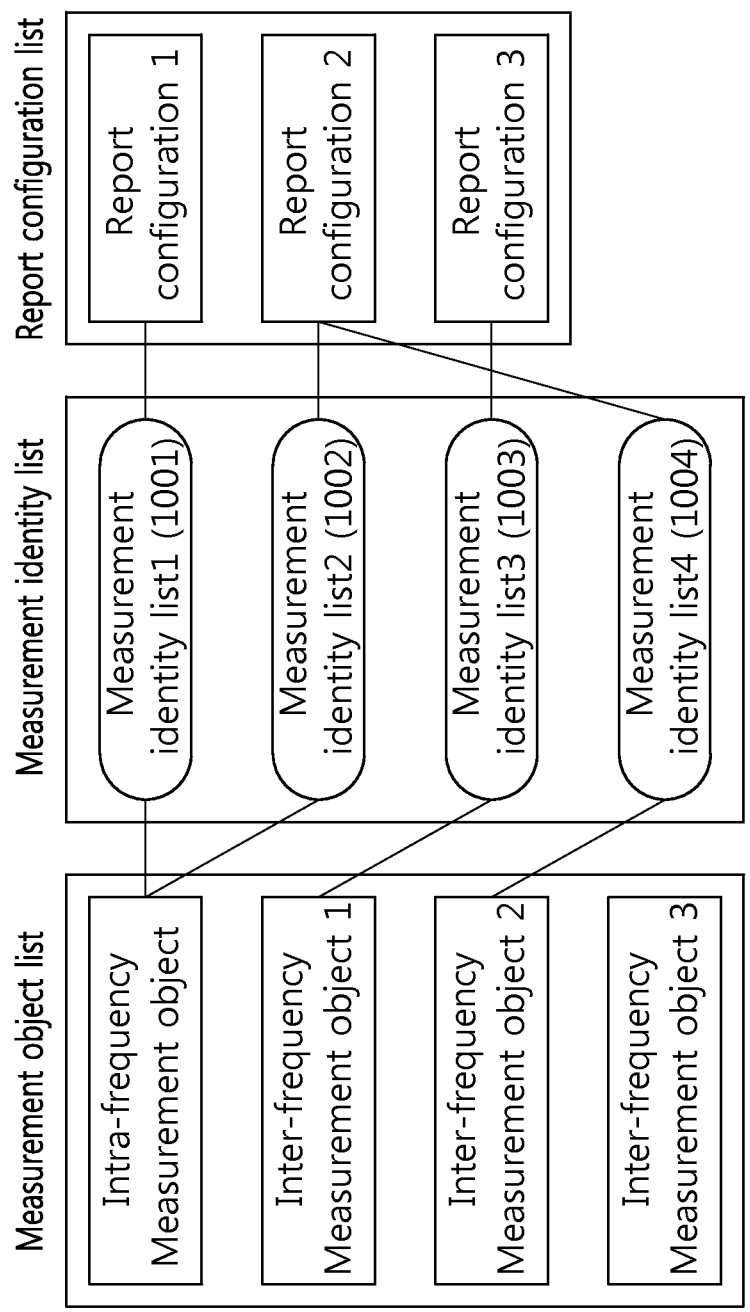
FIG. 10 illustrates an example of measurement configuration in the terminal.

FIG. 10 illustrates an example of measurement configuration in the terminal.

First, the measurement identity 1 (1001) connects an intra-frequency measurement object with a reporting configuration 1. The terminal performs intra frequency measurement, and the reporting configuration 1 is used to determine criterion and type of the measurement result reporting.

As in the measurement identity 1 (1001), the measurement identity 2 (1002) is connected to the intra-frequency measurement object, but connects the intra-frequency measurement object to the reporting configuration 2. The terminal performs measurement and the reporting configuration 2 is used to determine criterion and type of the measurement result reporting.

According to a measurement identity 1 (1001) and a measurement identity 2 (1002), even if a measurement result with respect to the intra-frequency measurement object satisfies one of reporting configuration 1 and reporting configuration 2, the terminal transmits the measurement result.

The measurement identity 3 (1003) connects the inter-frequency measurement object 1 to the reporting configuration 3. If the measurement result with respect to the inter-frequency measurement object 1 satisfies a reporting condition included in the reporting configuration 1, the terminal reports the measurement result.

The measurement identity 4 (1004) connects the inter-frequency measurement object 2 to the reporting configuration 2. If the measurement result with respect to the inter-frequency measurement object 2 satisfies a reporting condition included in the reporting configuration 2, the terminal reports the measurement result.

Meanwhile, the measurement object, reporting configuration and/or measurement identity may be added, changed, and/or removed. This may be indicated by sending a new measurement configuration message or the measurement configuration change message to the terminal.

Figure 11:
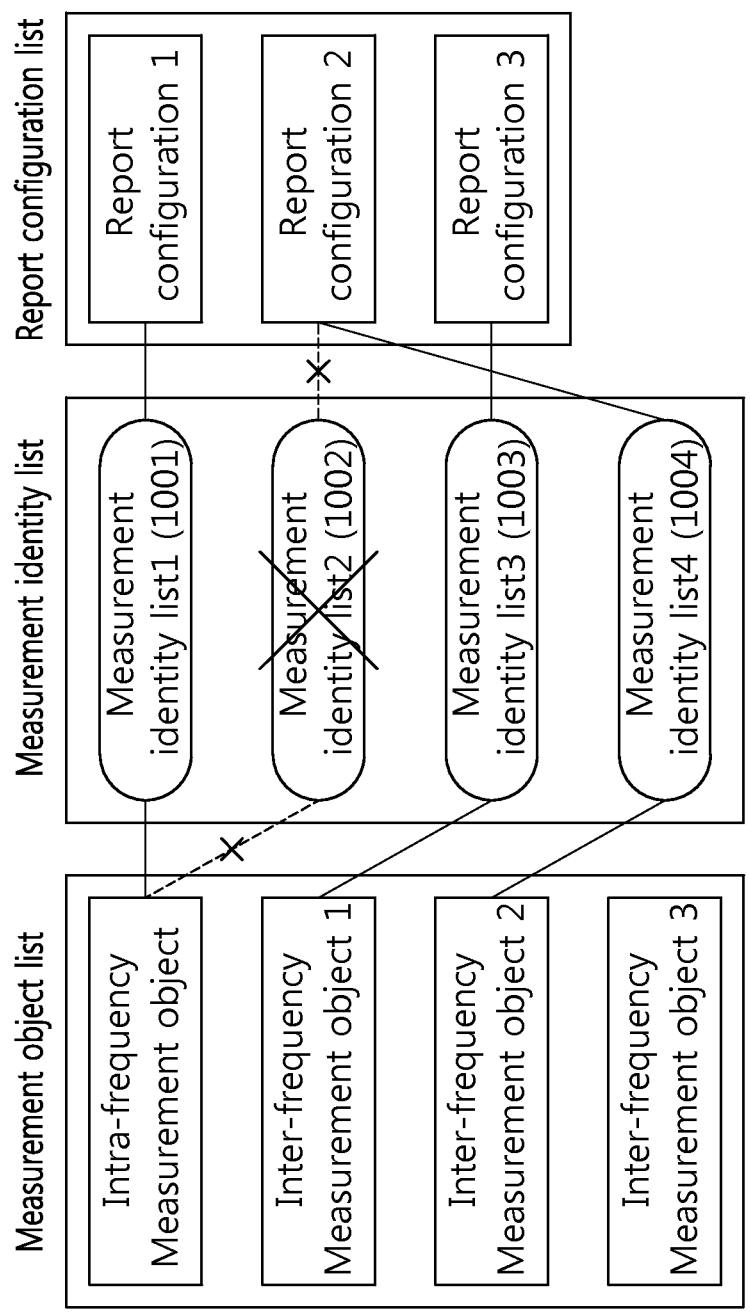
FIG. 11 illustrates an example of removing the measurement identity.

FIG. 11 illustrates an example of removing the measurement identity. If the measurement identity 2 (1002) is removed, measurement with respect to a measurement object associated with the measurement identity 2 (1002) is stopped and the measurement reporting is not transmitted. The measurement object associated with the removed measurement identity or the reporting configuration may not be changed.

Figure 12:
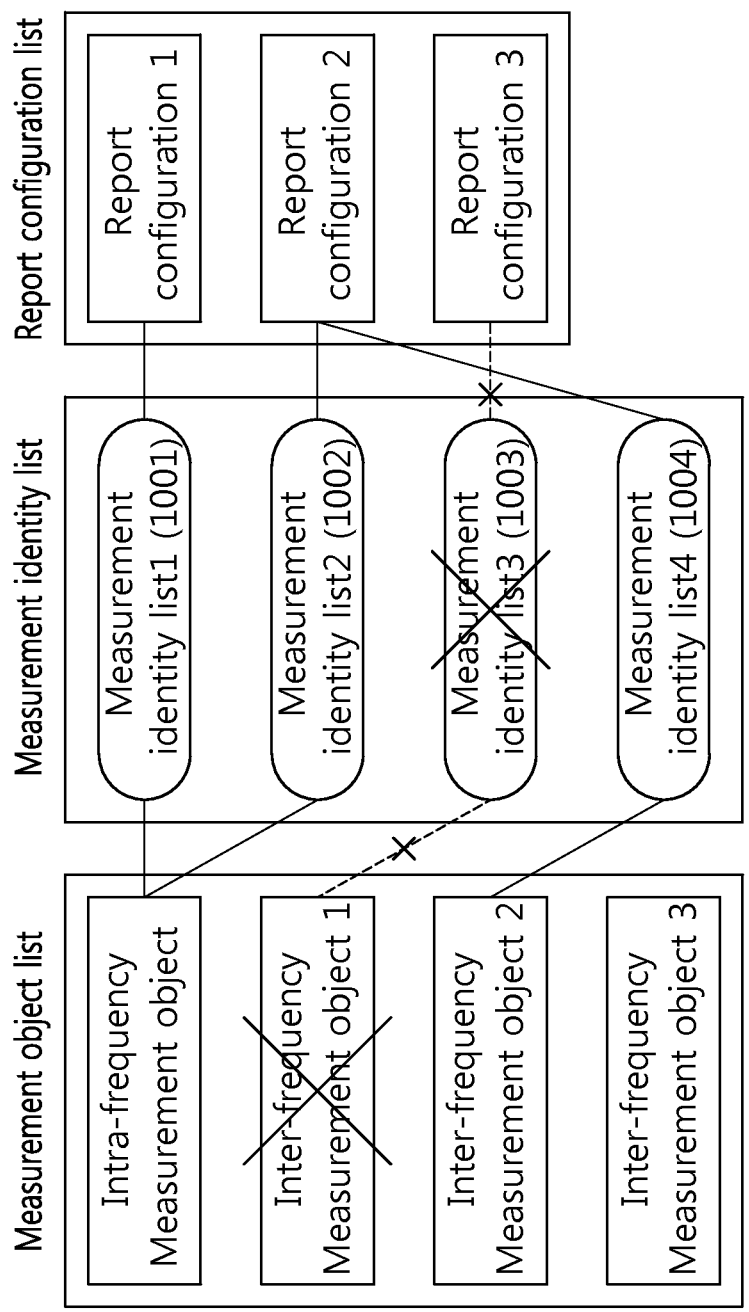
FIG. 12 illustrates an example of removing the measurement object.

FIG. 12 illustrates an example of removing the measurement object. If the inter-frequency measurement object 1 is removed, the terminal also remove the measurement identity 3 (1003) associated with the inter-frequency measurement object 1. Measurement with respect to the inter-frequency measurement object 1 is stopped and the measurement reporting is not transmitted. However, the reporting configuration associated with the remove inter-frequency measurement object 1 may not be changed or removed.

If the reporting configuration is removed, the terminal also removes a measurement identity associated with the reporting configuration. The terminal stops measurement with respect to the measurement object associated with the associated measurement identity. However, the measurement object associated with the removed reporting configuration may not be changed or removed.

The measurement reporting may include a measurement identity, measured quality of the serving cell and a measurement result of the neighboring cell. The measurement identity identifies a measurement object to which the measurement report is triggered. The measurement result of the neighboring cell may include a cell identity and measured quality of the neighboring cell. The measured quality may include at least one of Reference Signal Received Power (RSRP) and Reference Signal Received Quality (RSRQ).

Hereinafter, interworking between a 3GPP access network and other access network will be described.

A 3GPP introduces interworking with a non-3GPP access network (e.g. WLAN) from Rel-8 to find accessible access network, and regulates ANDSF (Access Network Discovery and Selection Functions) for selection. An ANDSF transfers accessible access network finding information (e.g. WLAN, WiMAX location information and the like), Inter-System Mobility Policies (ISMP) capable of reflecting policies of a business, and an Inter-System Routing Policy (ISRP). The terminal may determine whether to transmit certain IP traffic through a certain access network. An ISMP may include a network selection rule with respect to selection of one active access network connection (e.g., WLAN or 3GPP) by the terminal. An ISRP may include a network selection rule with respect to selection of at least one potential active access network connection (e.g., both of WLAN and 3GPP) by the terminal. The ISRP includes Multiple Access PDN Connectivity (MAPCON), IP Flow Mobility (IFOM), and non-seamless WLAN offloading. For dynamic provision between the ANDSF and the terminal, Open Mobile Alliance Device Management (OMA DM) or the like are used.

The MAPCON simultaneously configures and maintains a plurality of packet data networks (multiple PDN connectivity) through a 3GPP access network and a non-3GPP access network and regulates a technology capable of performing seamless traffic offloading in the whole active PDN connection unit. To this end, an ANDSF server provides APN (Access Point Name) information to perform offloading, inter-access network priority (routing rule), Time of Day to which offloading method is applied, and access network (Validity Area) information to be offloaded.

The IFOM supports mobility and seamless offloading of an IP flow unit of flexible subdivided unit as compared with the MAPCON. A technical characteristic of the IFOM allows a terminal to access through different access network when the terminal is connected to a packet data network using an access point name (APN). Mobility and a unit of offloading may be moved in a specific service IP traffic flow unit which is not a packet data network (PDN), the technical characteristic of the IFOM has flexibility of providing a service. To this end, an ANDSF server provides IP flow information to perform offloading, priority (routing rule) between access networks, Time of Day to which an offloading method is applied, and Validity Area where offloading is performed.

The non-seamless WLAN offloading refers to a technology which changes a certain path of a specific IP traffic to a WLAN and completely offloads traffic without passing through an EPC. Since the non-seamless WLAN offloading is not anchored in P-GW for supporting mobility, offloaded IP traffic may not continuously moved to a 3GPP access network. To this end, the ANDSF server provides information similar to information to be provided for performing an IFOM.

Figure 13:
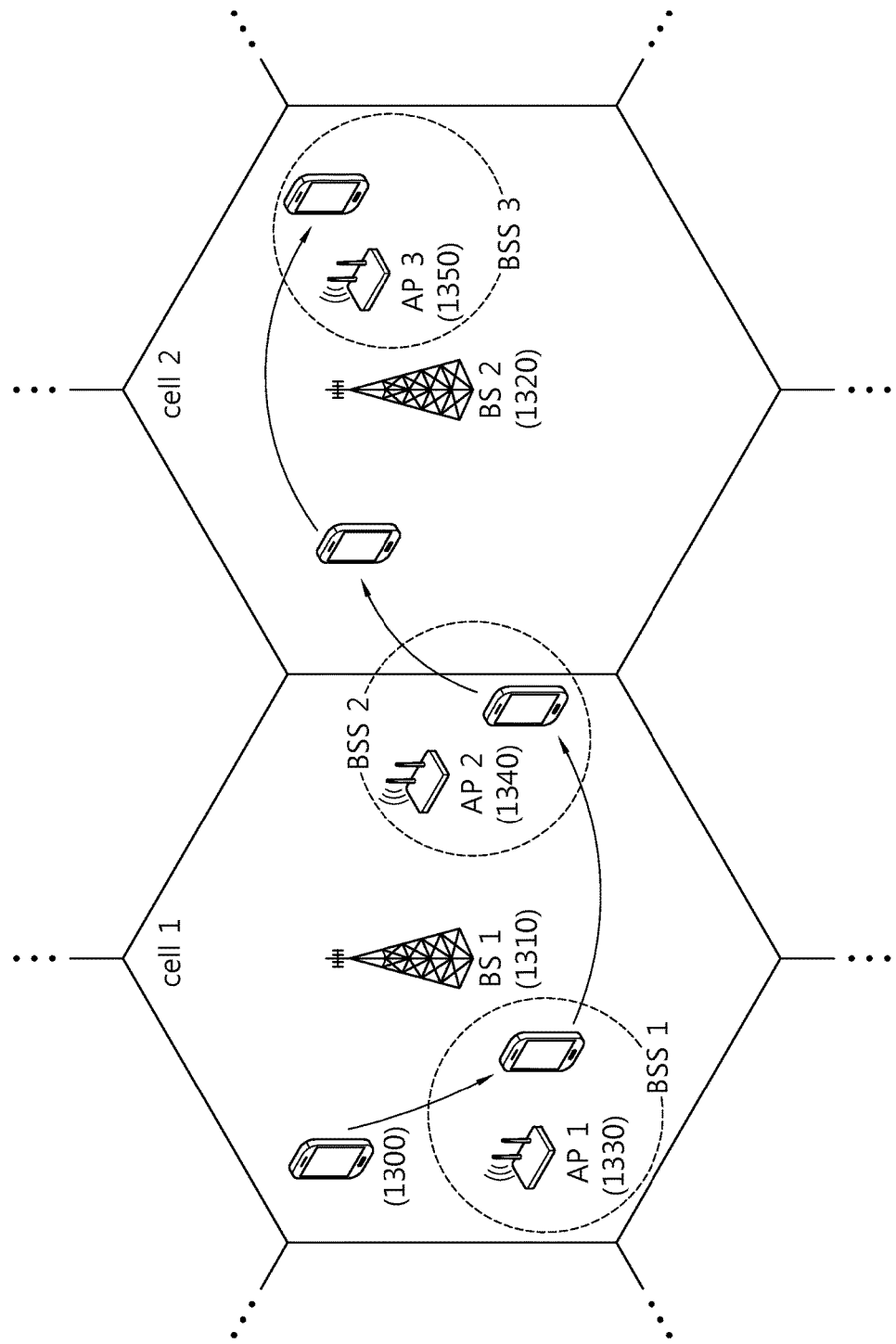
FIG. 13 is a diagram illustrating an example of an environment where a 3GPP access network and a WLAN access network coexist.

FIG. 13 is a diagram illustrating an example of an environment where a 3GPP access network and a WLAN access network coexist.

Referring to FIG. 13, a cell 1 centering a base station 1 (1310) and a cell 2 centering a base station 2 (1320) are deployed as a 3GPP access network. Further, a Basic Service Set (BSS) 1 as the WLAN access network centering an Access Point (AP) 1 (1330) located in a cell 1 and a BSS2 centering AP2 (1340) and deployed. A BSS3 centering a AP3 (1350) located in a cell 2 is deployed. Coverage of the cell is shown with a solid line, and coverage of BSS is shown with a dotted line.

It is assumed that the terminal 1300 is configured to perform communication through a 3GPP access network and a WLAN access network. In this case, the terminal 1300 may refer to a station.

First, the terminal 1300 may establish connection with a BS1 (1310) in a cell 1 to perform traffic through a 3GPP access network.

The terminal 1300 may enters coverage of BSS1 while moving into coverage of cell 1. In this case, the terminal 1300 may connect with a WLAN access network by performing association and authentication procedures with an AP1 (1330) of BSS1. Accordingly, the terminal 1300 may process traffic through a 3GPP access network and a WLAN access network. Meanwhile, the terminal 1300 moves and is separated from the coverage BSS1, connection with a WLAN access network may be terminated.

The terminal 1300 continuously move into the coverage of cell 1 and move around a boundary between cell 1 and cell 2, and enters coverage of BSS2 to find BSS2 through scanning. In this case, the terminal 1300 may connect with the WLAN access network by performing association and authentication procedures of AP2 (1340) of the BSS2. Meanwhile, since the terminal 1300 in the coverage of the BSS2 is located at a boundary between the cell 1 and the cell 2, service quality through the 3GPP access network may not be excellent. In this case, the terminal 1300 may operate to mainly process traffic through a WLAN access network.

When the terminal 1300 moves and is separated from the coverage of the BSS2 and enters a center of the cell 2, the terminal 1300 may terminate connection with the WLAN access network and may process traffic through a 3GPP access network based on the cell 2.

The terminal 1300 may enter coverage of the BSS3 while moving into the coverage of cell 2 to find the BSS1 through scanning. In this case, the terminal 1300 may connect with the WLAN access network by association and authentication procedures of an AP3 (1350) of the BSS3. Accordingly, the terminal 1300 may process the traffic through the 3GPP access network and the WLAN access network.

As illustrated in an example of FIG. 13, in a wireless communication environment where a 3GPP access network and a non-3GPP access network coexist, the terminal may adaptively process traffic through a 3GPP access network and/or a non-3GPP access network.

A plurality of interworking policies may be configured for interworking between the 3GPP access network and the non-3GPP access network as described above. Even if a plurality of interworking policies is equally configured in different UEs, the interworking policy adopted by the UE may be changed according to an individual UE.

As policies for interworking between the 3GPP access network and a non-3GPP access network, the above ANDSF may be configured. If the ANDSF is configured, the terminal may process traffic of the 3GPP access network through a non-3GPP access network or a 3GPP access network.

Meanwhile, interworking policies except for the ANDSF may be configured. In order to easily use the WLAN except for ANDSF in a current 3GPP network, interworking policies reflecting measurement parameters such as load and signal quality of the 3GPP access and/or the WLAN access network are defined. Hereinafter, the policy refers to an RAN policy. Further, a traffic steering rule according to an RAN policy refers to an RAN rule.

The RAN rule may be provided to the UE together with at least one RAN rule parameter for evaluating traffic steering according to the RAN rule. The RAN rule and the RAN rule parameter may be configured as follows.

1) The RAN rule may indicate whether traffic steering to a WLAN is allowed.

2) The RAN rule may indicate a traffic steering estimation condition being a condition allowed or required by traffic steering performing to the WLAN access network from the 3GPP access network. The condition according to the RAN rule may involve estimation of measurement results with respect to an LTE cell. Further, the condition according to the RAN rule may involve estimation of measurement results with respect to the WLAN. The estimation may be comparison of the measurement result with an RAN rule parameter (e.g., a measurement threshold value and the like) indicated in the traffic steering information. The following illustrates an example of a traffic steering estimation condition considered by the terminal.

(I) Traffic Steering Condition to a WLAN Access Network
RSRP measurement value (measured_RSRP)<low RSRP threshold value (Threshold_RSRP_low)
3GPP load measurement value (measured_3GPPLoad)>high 3GPP load threshold value (Threshold_3GPPLoad_High)
WLAN load measurement value (measured_WLANLoad)<low WLAN load threshold value (Threshold_WLANLoad_low)
WLAN signal strength measurement value (measured_WLANsignal)>high WLAN signal strength threshold value (Threshold_WLANsignal_high)

(II) Traffic Steering Condition to 3GPP Access Network
RSRP measurement value (measured_RSRP)>high RSRP threshold value (Threshold_RSRP_high)
3GPP load measurement value (measured_3GPPLoad)<low 3GPP load threshold value (Threshold_3GPPLoad_High)
WLAN load measurement value (measured_WLANLoad)>high WLAN load threshold value (Threshold_WLANLoad_high)
WLAN signal strength measurement value (measured_WLANsignal)<low WLAN signal strength threshold value (Threshold_WLANsignal_low)

Meanwhile, the estimation condition may be configured while the at least one condition is coupled with each other using and/or. For example, the traffic steering estimation condition implemented by coupling the at least one condition may be implemented as follows.

Traffic steering estimation condition for traffic steering to WLAN: (measured_RSRP<Threshold_RSRP_low)

and
(measured_WLANLoad<Threshold_WLANLoad_low)
and
(measured_WLANsignal>Threshold_WLANsignal_high)
Traffic steering estimation condition for traffic steering to 3GPP: (measured_RSRP>Threshold_RSRP_low) or (measured_WLANLoad>Threshold_WLANLoad_high) or
(measured_WLANsignal<Threshold_WLANsignal_low)

3) The RAN rule may indicate a condition where traffic steering performing to a 3GPP access network from the WLAN access network is allowed or required.

4) The RAN rule may indicate an object WLAN access network where performing the traffic steering from the 3GPP access network is allowed or required.

5) The RAN rule may indicate traffic in which routing is allowed to the WLAN access network. Alternatively, the RAN rule may indicate at least one traffic where routing to the WLAN access network is allowed, that is, which may be served by the 3GPP access network.

Meanwhile, the ANDSF configured in the UE may include a legacy ANDSF and/or an enhanced ANDSF.

The legacy ANDSF may be defined as an ANDSF which does not include ANDSF management object (MO) such as corresponding parameters defined in the RAN rule parameter. Unlike the legacy ANDSF, the enhanced ANDSF may be defined as an ANDSF including an ANDSF MO such as corresponding parameters defined in a RAN rule parameter.

Figure 14:
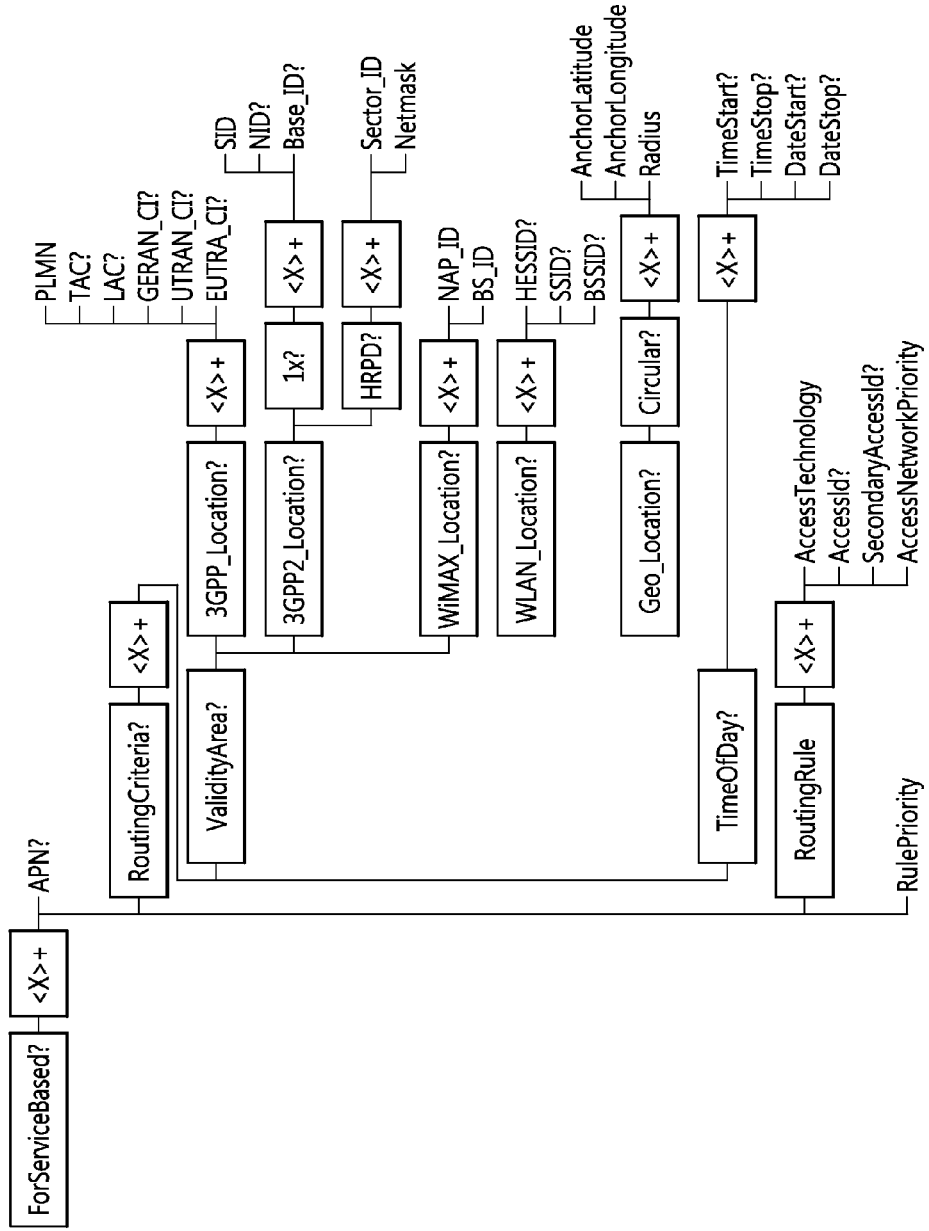
FIG. 14 is a diagram illustrating an example of a legacy ANDSF with respect to an MAPCON.
Figure 15:
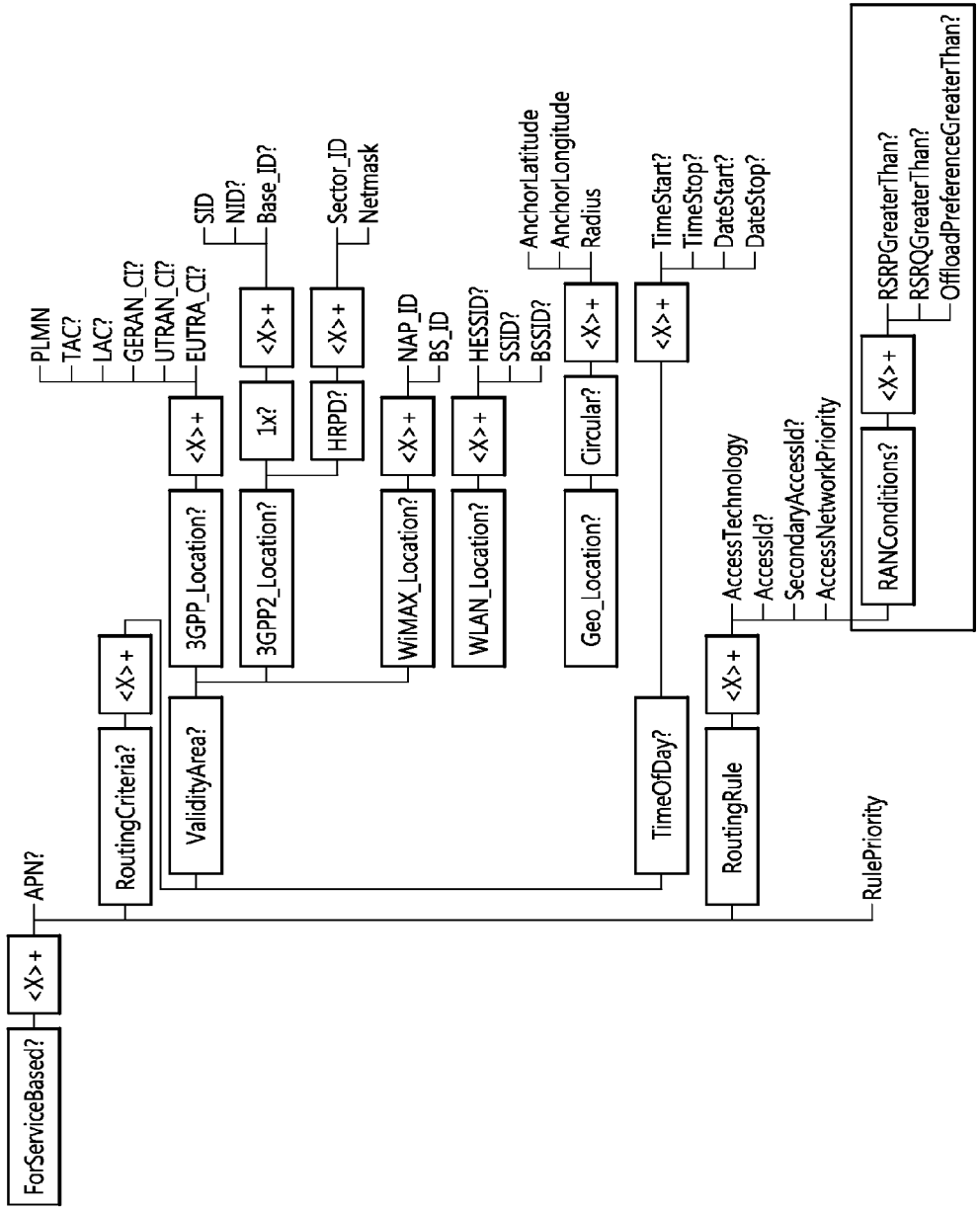
FIG. 15 is a diagram illustrating an example of an enhanced ANDSF with respect to the MAPCON.

FIG. 14 is a diagram illustrating an example of a legacy ANDSF with respect to an MAPCON, and FIG. 15 is a diagram illustrating an example of an enhanced ANDSF with respect to the MAPCON.

Referring to FIG. 14, the legacy ANDSF does not include an RAN rule parameter such as RSRP and a WLAN signal level as an ANDSF MO.

Meanwhile, referring to FIG. 15, the enhanced ANDSF may include RSRP, RSRQ, and an offload preference as the ANDSF MO. Further, the ANDSF may include a WLAN signal level (e.g. RSSI, RSCP), a WLAN load level, a WLAN backhaul data rate, and a WLAN backhaul load.

The enhanced ANDSF may specify the traffic steering evaluation condition associated with each ANDSF MO. The traffic steering evaluation condition specified by the enhanced ANDSF may be configured similar to the traffic steering evaluation condition associated with the configured RAN rule parameter configured by the RAN rule. A detailed description thereof will be omitted.

If a plurality of interworking policies is configured in the terminal, a plurality of traffic steering rules according to a plurality of interworking policies may collide with each other. Further, in a side of the business, a preferred interworking policy may be changed according to a requirement of the business among a plurality of interworking policies. The UE may perform traffic steering according to a traffic steering rule of a specific interworking policy regardless of the above. The above may cause the UE to inefficiently process the traffic or not to normally process partial traffic.

Hereinafter, a method of providing information on the preferential traffic steering rule of the UE to the network is suggested. Accordingly, the network is not inverted with respect to preference, and may configure and provide traffic steering information suitable for the UE to the UE, and the UE may perform traffic steering based on the above.

For a convenience of explanation, it is assumed that non-3GPP access network is a WLAN access network. However, the embodiment of the present invention is not limited thereto and it can be applied to a traffic steering method considering a general non-3GPP access network. Further, ANDSF policy (including legacy/enhanced ANDSF) and RAN policy are exemplified as interworking policies which can be configured to the UE.

Figure 16:
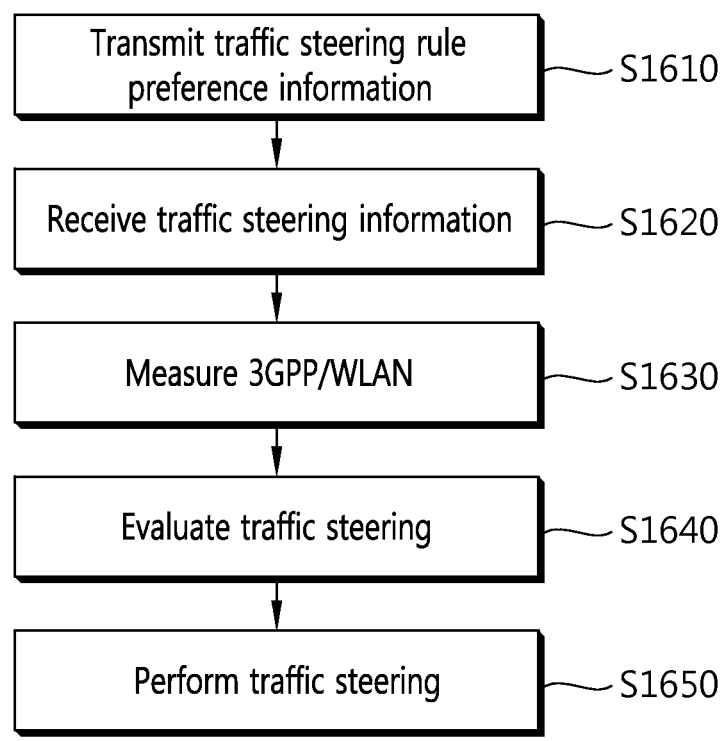
FIG. 16 is a diagram illustrating a method of steering traffic performed by the UE according to an embodiment of the present invention.

FIG. 16 is a diagram illustrating a method of steering traffic performed by the UE according to an embodiment of the present invention.

Referring to FIG. 16, the UE transmits UE traffic steering preference information to a 3GPP access network (S1610). The UE may transmit the traffic steering preference information as a part of UE capability value signaling with respect to the 3GPP access network. The UE may transmit the traffic steering preference information as a response to a request of the 3GPP access network. The UE may transmit the traffic steering signal information when an ANDSF state is changed. The changing of the ANDSF state may be a case of configuring the ANDSF rule in the UE, a case of removing the configured ANDSF rule, or a case where the configured ANDSF rule is no longer effective.

The UE traffic steering preference information may be configured as follows.

1) Indication of the configured traffic steering rule or the preferred traffic steering rule The UE traffic steering preference information may indicate whether the ANDSF rule is previously configured in the UE.

The UE traffic steering preference information may indicate whether the legacy ANDSF rule or the enhanced ANDSF rule is configured in the UE.

The UE traffic steering preference information may indicate that the ANDSF rule is preferential as compared with the RAN rule in traffic steering for selecting the access network.

The UE traffic steering preference information may indicate that the RAN rule is preferential as compared with the ANDSF rule in traffic steering for selecting the access network.

2) The UE traffic steering preference information may indicate an access network preferred by the UE.

The UE traffic steering preference information may indicate that the UE prefers a 3GPP access network to a non-3GPP access network. For example, the UE traffic steering preference information may indicate that the UE prefers a LTE cell to a WLAN BSS.

The UE traffic steering preference information may indicate that the UE prefers the non-3GPP access network to the 3GPP access network. For example, the UE traffic steering preference information may indicate that the UE prefers the WLAN BSS to the LTE cell.

3) The UE traffic steering preference information may indicate a traffic type preferred by the terminal that the traffic is served through a specific access network.

The UE traffic steering preference information may indicate a traffic type preferred by the terminal that the traffic is served through the 3GPP access network. For example, the traffic in which the service is preferred by the LTE cell may include traffic communicated in a wireless bearer to which a specific QoS Class Indicator (QCI) is allocated. In more detail, the traffic in which the service is preferred by the LTE cell may include sound traffic. A QCI 1 may be allocated to the wireless bearer for service of sound traffic.

The UE traffic steering preference information may indicate a traffic type preferred by the terminal in which the traffic is served through the non-3GPP access network. For example, the traffic in which service by the WLAN is preferred may include traffic in a wireless bearer to which a specific QCI is allocated. In more detail, the traffic in which the service by the WLAN is preferred may include a TCP based service. In general, a TCP based service may include an e-mail service served by a wireless bearer to which QCI 6, 8 or 9 is allocated.

If the 3GPP access network receives the UE traffic steering preference information, the 3GPP access network may generate traffic steering information based on the UE traffic steering preference information. For example, the LTE cell may generate traffic steering information suitable for optimized traffic steering of the UE. The traffic steering information may include a RAN rule and/or RAN rule parameter. The traffic steering information may be generated by the 3GPP access network as follows.

- If the UE traffic steering preference information indicates that a suitable ANDSF rule is configured in the UE, when the RAN rule parameter using the rule parameter may the traffic steering which is not preferred by the UE according to an ANDSF rule, the traffic steering information may be configured not to include a corresponding RAN rule parameter.
- If the UE traffic steering preference information indicates that the legacy ANDSF rule is configured, when the RAN rule using the RAN rule parameter may cause traffic steering which is not preferred by the terminal, the traffic steering information may be configured not to include a corresponding RAN rule parameter.
- If the UE traffic steering preference information indicates that the enhanced ANDSF rule is configured, the traffic steering information may be configured to include the RAN rule parameter. In this case, a MO of the enhanced ANDSF previously configured in the UE may be updated according to an RAN rule parameter provided according to the traffic steering information.
- If the UE traffic steering preference information indicates that the RAN rule is preferred to the ANDSF rule, the traffic steering information may be configured to include the RAN rule parameter in order to perform traffic steering based on the RAN rule.
- If the UE traffic steering preference information indicates that the ANDSF is preferred to the RAN rule, when the RAN rule using the RAN rule parameter may cause traffic steering which is not preferred by the UE according to the ANDSF rule, the traffic steering information may be configured not to include a corresponding RAN rule parameter.

The 3GPP access network transmits the configured traffic steering information to the UE, and the UE receives the traffic steering information (S1420). The 3GPP access network may transmit the traffic steering information to the UE through broadcasting signaling or dedicated signaling.

If the UE receives the traffic steering information, the UE may update the traffic steering rule for evaluating the traffic steering. If the RAN rule parameter included in the traffic steering information corresponds to the ANDSF MO configured in the UE, the UE may update a corresponding ANDSF MO to a received RAN rule parameter.

The UE receiving the traffic steering information may disregard the traffic steering information. When the traffic steering information matches with preference with respect the traffic steering rule, the UE may disregard the received traffic steering information. Meanwhile, presence of allowance with respect to disregarding of the UE with respect to the traffic steering information may be signaled. The access network may provide a flag indicating the presence of the allowance to the UE through broadcast signaling or dedicated signaling.

For example, when the UE reports that the legacy ANDSF rule is previously configured in the UE to the 3GPP access network, and the 3GPP access network provides a RAN rule parameter which may not be applied to the configured ANDSF, the UE may perform traffic steering by disregarding the RAN rule parameter and applying an existing ANDSF rule.

If the terminal receiving the traffic steering information, the terminal performs measurement (S1630). The UE may perform measurement with respect to a peripheral 3GPP access network and/or WLAN access network to acquire the measurement result. The UE may perform the measurement in order to acquire the measurement result associated with the RAN rule parameter of the traffic steering information. The UE may perform measurement in order to acquire the measurement result associated with the ANDSF MO of the enhanced ANDSF.

The measurement of the UE with respect to the 3GPP access network may include a procedure of performing measurement with respect to the serving cell and/or a neighboring cell to acquire a RSRQ and/or a RSRP. The measurement of the UE with respect to the 3GPP access network may include a procedure of receiving and acquiring load information from the serving cell and/or the neighboring cell.

The measurement of the UE with respect to the WLAN access network may include a procedure of measuring a signal transmitted from an AP in a current BSS to acquire a Received Signal Strength Indicator (RSSI) and/or a Receive Strength Carrier Pilot (RSCP). The measurement of the UE with respect to the WLAN access network may include a procedure of receiving a BSS load information element from the AP in a current BSS.

The UE performs traffic steering evaluation (S1640). The terminal may perform the traffic steering evaluation based on the current configured traffic measurement rule.

When the terminal prefer to the legacy ANDSF, the UE may perform traffic steering evaluation based on the legacy ANDSF.

When the UE prefers to the enhanced ANDSF and an enhanced ANDSF is updated based on the received traffic steering information, the terminal may perform traffic steering evaluation based on the updated ANDSF.

When the terminal prefers to a RN rule and the RAN rule is provided according to the received traffic steering information, the UE may perform the traffic steering evaluation based on the RAN rule.

Meanwhile, the UE may estimate whether to satisfy the traffic steering evaluation condition specified in the legacy/enhanced ANDSF and/or RAN rule by comparing the ANDSF MO and/or RAN rule parameter.

When the UE finds the interest non-3GPP access network, the UE may be configured to perform traffic steering evaluation. The interest non-3GPP access network may be previously configured according to the 3GPP access network.

When the traffic steering is allowed or required according to the traffic steering evaluation performed according to the traffic steering rule, the UE may steer the traffic to the 3GPP access network or to the WLAN access network. The UE may steer the traffic to the WLAN access network by routing and processing the traffic to the WLAN access network. The traffic steering of the UE to the 3GPP access network may include a procedure of routing a corresponding traffic to the 3GPP access network from the WLAN access network when the traffic is processed in the WLAN access network. Further, the traffic steering of the UE to the 3GPP access network may include a procedure of starting a newly generated traffic processing from the 3GPP access network.

The performing the traffic steering may include a procedure of changing an access network to provide a service for specific traffic. For example, internet traffic may change an access network to be processed from the WLAN access network, and the access network processing existing internet traffic may continuously process other traffic.

Hereinafter, a detailed example of a method of steering traffic according to an embodiment of the present invention will be described.

Figure 17:
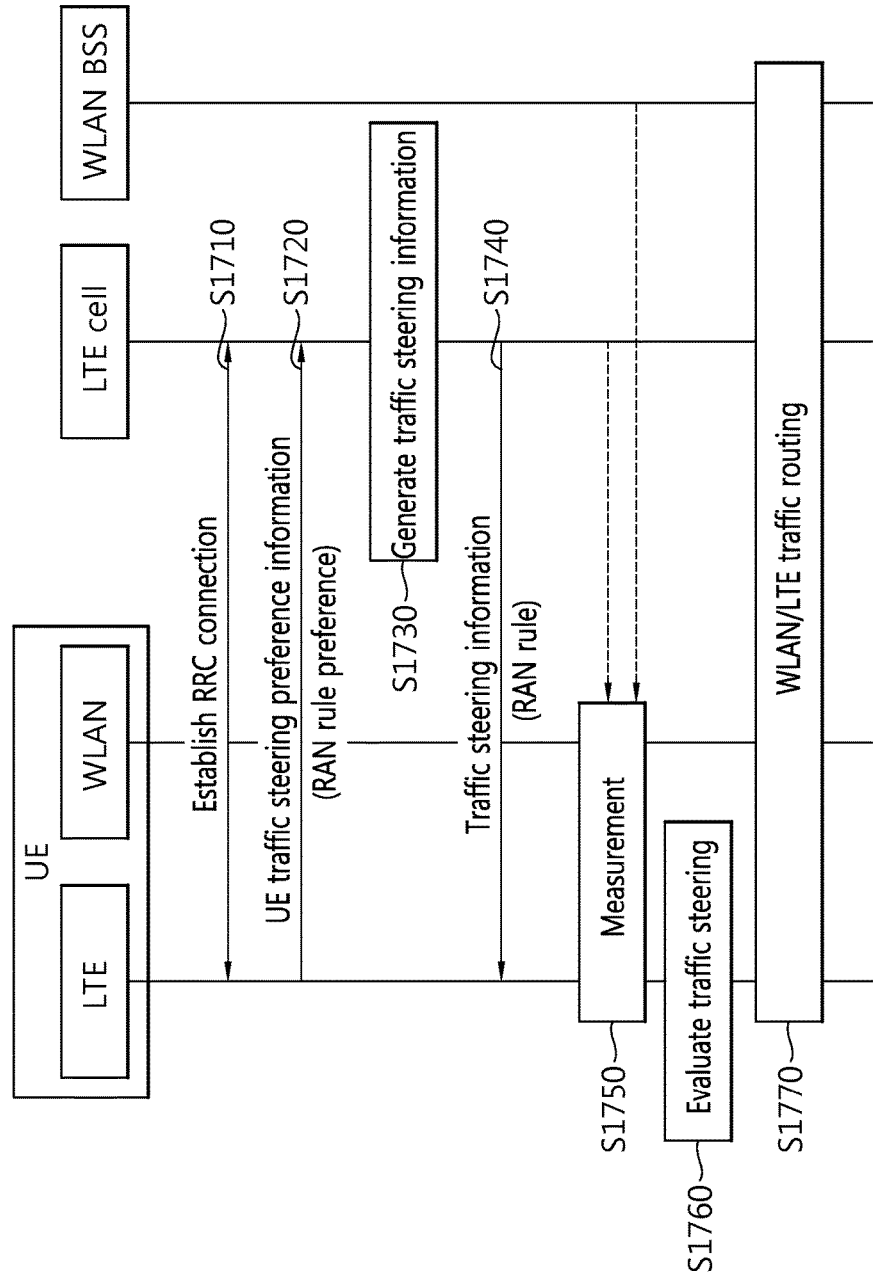
FIG. 17 is a diagram illustrating an example of a method of steering traffic according to an embodiment of the present invention.

FIG. 17 is a diagram illustrating an example of a method of steering traffic according to an embodiment of the present invention.

Referring to FIG. 17, it is assumed that the UE supports both of LTE based communication and WLAN based communication, and the LTE based communication and the WLAN based communication may be independently achieved. In addition, the WLAN is deployed in coverage of the LTE cell so that the network assumes an environment capable of receiving a WLAN service by competing coupling with the WLAN.

The UE establishes RRC connection with the LTE cell (S1710).

The UE transmits UE traffic steering preference information to the LTE cell (S1720). The UE traffic steering preference information may indicate that the UE prefers the RAN rule to the ANDSF rule.

If the LTE cell receives the UE traffic steering preference information, the LTE cell generates traffic steering information (S1730). The LTE cell may be configured so that the traffic steering information includes the RAN rule parameter in order to perform traffic steering based on the RAN rule. In addition, the LTE cell may be configured to further include a RAN rule associated with the RAN rule parameter.

As described above, the RAN rule parameter included in the traffic steering information may include at least one threshold value for evaluating the traffic steering. As mentioned above, the RAN rule included in the traffic steering information may specify a traffic steering evaluation condition.

The LTE cell transmits the traffic steering information including the RAN rule and/or the RAN rule parameter to the UE (S1740).

If the UE receives the traffic steering information, the UE performs measurement with respect to the LTE cell and the WLAN BSS to acquire the measurement result (S1750). The UE may selectively perform measurement based on the RAN rule and/or the RAN rule parameter included in the traffic steering information to acquire a measurement result associated with the RAN rule and/or the RAN rule parameter.

The UE perform traffic steering evaluation (S1760). The UE may perform the traffic steering evaluation based on the traffic steering evaluation associated with the RAN rule parameter included in the traffic steering information. Alternatively, the UE may perform the traffic steering evaluation based on the traffic steering evaluation condition specified according to the RAN rule included in the traffic steering information. If the steering evaluation condition is satisfied, the UE may determine to perform the traffic steering.

If the UE determines to perform the traffic steering, the UE performs traffic steering. The traffic steering performed by the UE may include a procedure of routing the traffic to a WLAN/LTE access network (S1770). The UE may process the LTE traffic by routing the LTE traffic to a WLAN BSS. The UE may rout the traffic processed through the WLAN BSS to the LTE cell.

When the RAN rule of the traffic steering information indicates specific traffic in which traffic steering is allowed, the UE may rout only the traffic indicated by the RAN rule to the WLAN/LTE access network.

Figure 18:
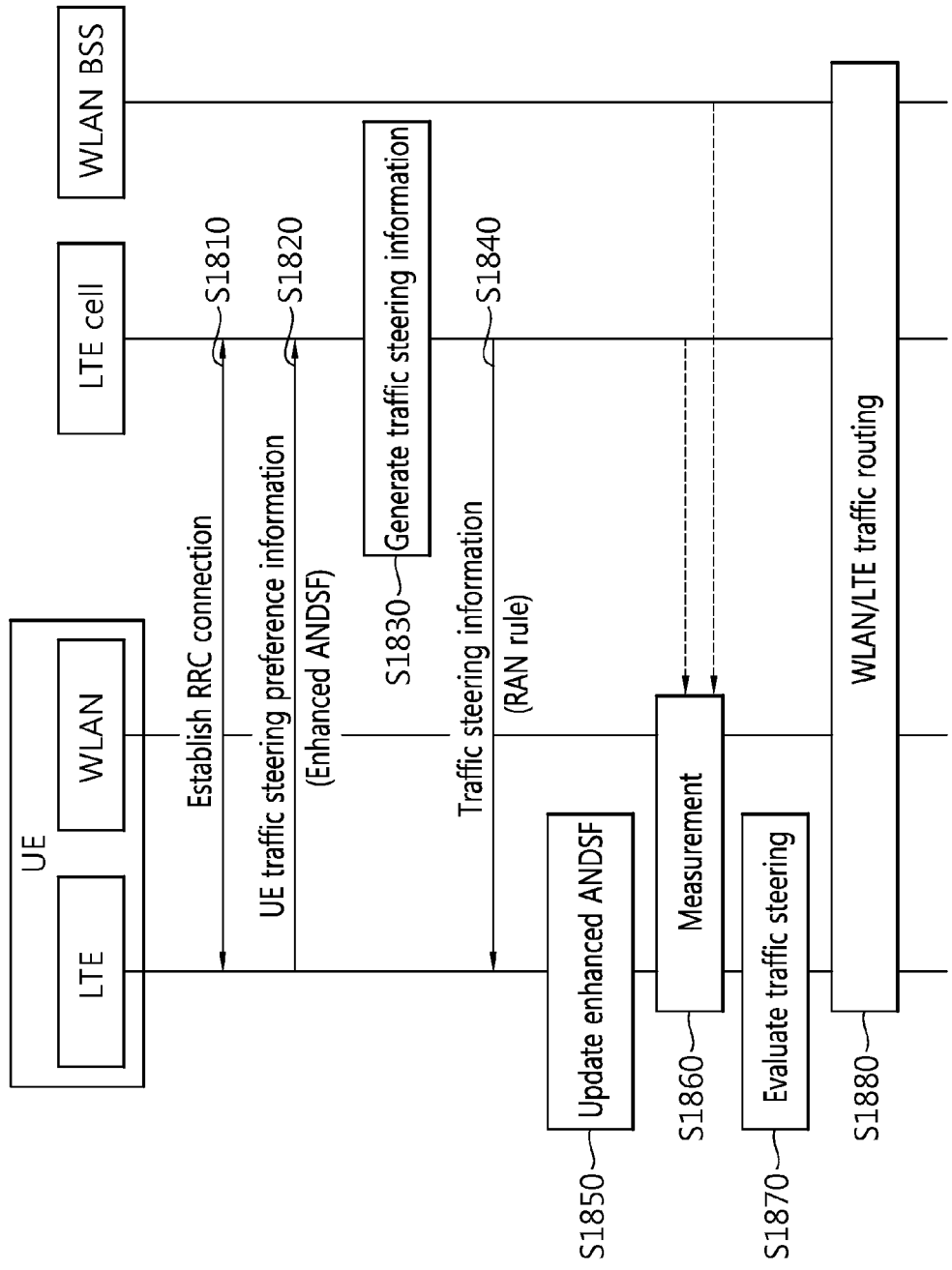
FIG. 18 is a diagram illustrating an example of a method of steering traffic according to an embodiment of the present invention.

FIG. 18 is a diagram illustrating an example of a method of steering traffic according to an embodiment of the present invention.

Referring to FIG. 18, it is assumed that the UE supports both of LTE based communication and WLAN based communication, and the LTE based communication and the WLAN based communication are independently achieved. In addition, the WLAN is deployed in coverage of the LTE cell so that the network assumes an environment capable of receiving a WLAN service by competing coupling with the WLAN so that the network assumes environment. Further, it is assumed that the enhanced ANDSF is configured in the UE.

The UE establishes RRC connection with the LTE cell (S1810).

The UE transmits UE traffic steering preference information to the LTE cell (S1820). The UE traffic steering preference information may indicate that the enhanced ANDSF is configured in the UE.

If the LTE cell receives the UE traffic steering preference information, the LTE cell generates traffic steering information (S1830). The LTE cell may be configured to perform the traffic steering based on the enhanced ANDSF and/or RAN rule so that the traffic steering information includes a RAN rule parameter. When the LTE cell may recognize how to configure the enhanced ANDSF, the LTE cell may be configured to include only a RAN rule parameter associated with an ANDSF MO of the ANDSF including enhanced traffic steering information and not to include a RAN rule parameter which is not associated with the ANDSF MO of the ANDSF. As described above, the RAN rule parameter included in the traffic steering information may include at least one threshold value for evaluating traffic steering.

Further, the LTE cell may be configured so that the traffic steering information further includes the RAN rule associated with the RAN rule parameter. As described, the RAN rule included in the traffic steering information may specify the traffic steering evaluation condition.

The LTE cell transmits traffic steering information including a RAN rule and/or a RAN rule parameter to the UE (S1840).

If the UE receives the traffic steering information, the UE updates the enhanced ANDSF (S1850). If the RAN rule parameter included in the traffic steering information corresponds to the configured ANDSF MO, the UE may update a corresponding ANDSF MO to the RAN parameter.

In addition, when the traffic steering information includes a RAN rule specifying the steering evaluation condition and the RAN rule is associated with the ANDSF MO, the UE may update the traffic steering evaluation condition associated with the ANDSF MO to a traffic steering evaluation condition according to the RAN rule.

If the UE receives the traffic steering information, the UE performs measurement with respect to the LTE cell and the WLAN BSS to acquire a measurement result (S1860). The UE may selectively perform measurement based on the updated ANDSF MO to acquire the measurement result associated with the ANDSF MO.

The UE performs traffic steering evaluation (S1870). The UE may perform the traffic steering evaluation based on the traffic steering evaluation condition associated with the updated ANDSF MO. If the steering evaluation condition is satisfied, the UE may determine to perform traffic steering.

If the UE determines to perform the traffic steering, the UE performs traffic steering. The traffic steering performed by the UE may include a procedure of routing the traffic to a WLAN/LTE access network (S1880). The terminal may rout the LTE traffic to the WLAN BSS to be processed. The UE may rout the traffic processed through the WLAN BSS to be processed.

Figure 19:
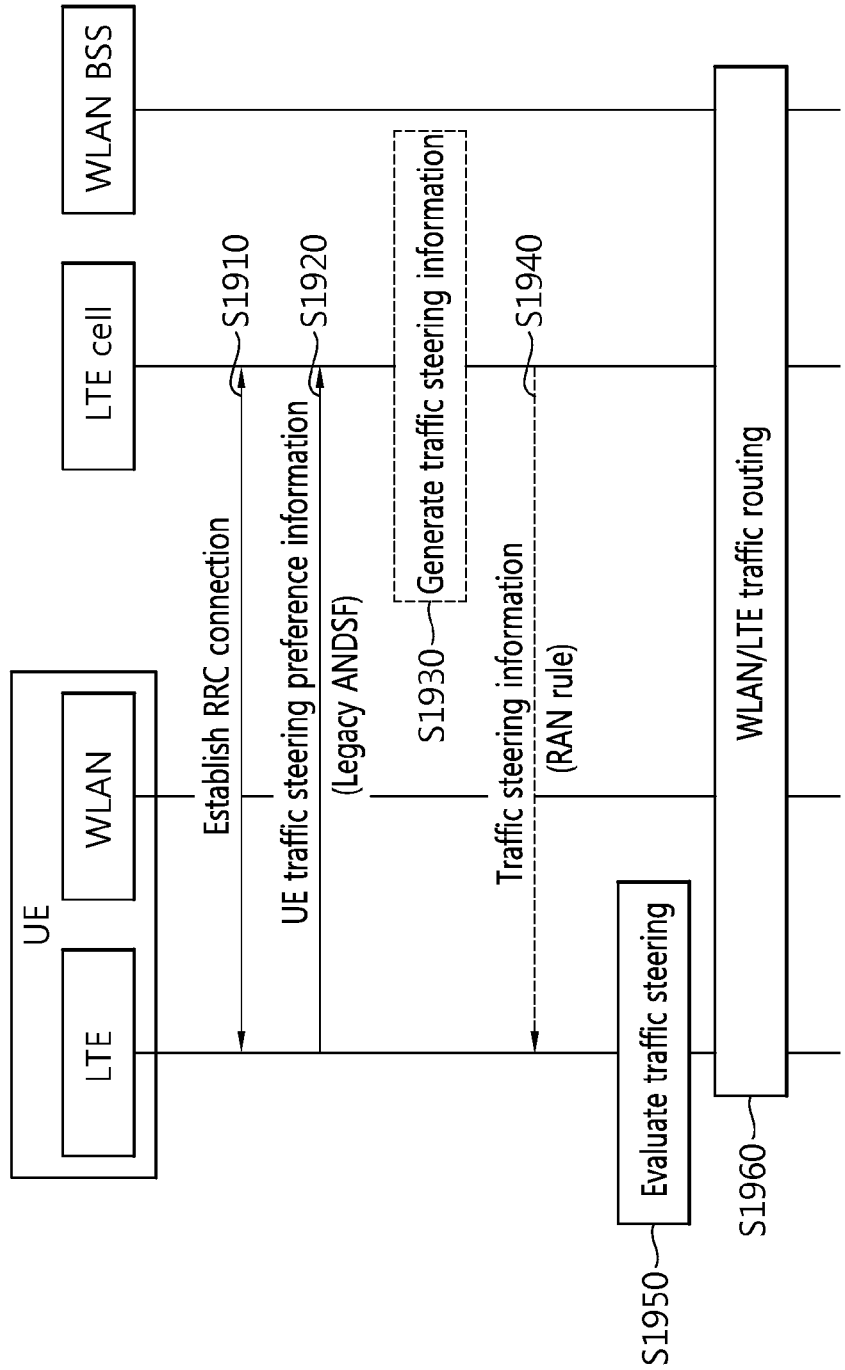
FIG. 19 is a diagram illustrating an example of a method of steering traffic according to an embodiment of the present invention.

FIG. 19 is a diagram illustrating an example of a method of steering traffic according to an embodiment of the present invention.

Referring to FIG. 19, it is assumed that the UE supports both of LTE based communication and WLAN based communication, and the LTE based communication and the WLAN based communication may be independently achieved. In addition, the WLAN is deployed in coverage of the LTE cell so that the network assumes an environment capable of receiving a WLAN service by competing coupling with the WLAN so that the network assumes environment. Further, it is assumed that the enhanced ANDSF is configured in the UE.

The UE establishes RRC connection with the LTE cell (S1910).

The UE transmits UE traffic steering preference information to the LTE cell (S1920). The UE traffic steering preference information may indicate that a legacy ANDSF is configured in the UE.

If the LTE cell receives the UE traffic steering preference information indicating that the legacy ANDSF is configured, the LTE cell may determine whether to configure and transmit the traffic steering information. If the traffic steering which is not preferred by the UE is generated according to the configured legacy ANDSF, the LTE cell may not configure the traffic steering information. Alternatively, the LTE cell may configure the traffic steering information having no RAN rule and RAN rule parameter, and may transmit the traffic steering information to the UE.

If the traffic steering evaluation condition according to the RAN rule and/or the RAN rule parameter together with the legacy ANDSF configured in the UE may cause the traffic steering preferred by the UE, the LTE generates traffic steering information suitably applicable to the legacy ANDSF (S1930). The LTE cell may add the RAN rule and/or the RAN rule parameter which is suitably applicable together with the legacy ANDSF to the traffic steering information.

Alternatively, the LTE cell may generate traffic steering information regardless of that the UE traffic steering preference information indicates that the legacy ANDSF is configured. In this case, the LTE cell may add the RAN rule and/or the RAN rule parameter to the traffic steering information.

If the LTE cell generates the traffic steering information, the LTE cell transmits the traffic steering information to the UE (S1940). The traffic steering information may include the RAN rule and/or the RAN rule parameter.

The UE may determine a performing scheme of traffic steering evaluation.

If the UE does not receive the traffic steering information for a specific time after transmitting the UE traffic steering preference information, the UE may determine to perform the traffic steering evaluation based on the legacy ANDSF.

If the received traffic steering information does not include the RAN rule and the RAN rule parameter, the UE may determine to perform the traffic steering evaluation based on the legacy ANDSF.

When the received traffic steering information includes the RAN rule and/or the RAN rule parameter, the UE determines whether the included RAN rule and/or RAN rule parameter is suitably applicable to the legacy ANDSF. The UE may update the legacy ANDSF to the RAN rule and/or the RAN rule parameter which are suitably applicable. Meanwhile, the UE may disregard the RAN rule and/or the RAN rule parameter which is not suitably applicable.

The UE performs traffic steering evaluation based on the traffic steering information (S1950). The UE may perform the traffic steering evaluation based on the existing legacy ANDSF or the updated ANDSF. If the steering evaluation condition is satisfied, the UE may determine to perform the traffic steering.

If the UE determined to perform the traffic steering, the UE performs the traffic steering. The traffic steering performed by the UE may include a procedure of routing the traffic to the WLAN/LTE access network (S1960). The UE may rout the LTE traffic to the WLAN BSS to be processed. The UE may rout the traffic processed through the WLAN BSS to the LTE cell to be processed.

In accordance with the method of steering traffic according to the present invention, the UE transmits preference information associated with traffic steering to the 3GPP access network so that a suitable interworking policy may be configured in the UE. The UE performs traffic steering through an interworking policy in which preference of the UE is reflected to efficiently process the traffic. Irreconcilable interworking policy (or traffic steering rule) is prevented from being configured in the UE so that a traffic process rate and reliability may be improved.

Figure 20:
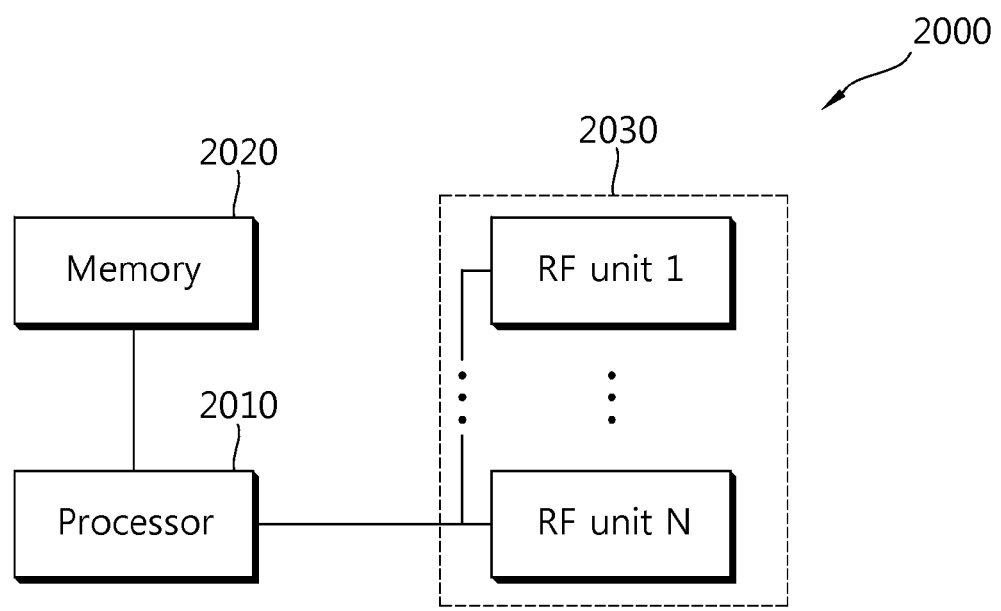
FIG. 20 is a block diagram illustrating a wireless apparatus according to an embodiment of the present invention.

FIG. 20 is a block diagram illustrating a wireless apparatus according to an embodiment of the present invention. The wireless apparatus may implement the terminal and/or the network according to the above embodiment with reference to FIGS. 14 to 19.

Referring to FIG. 19, the wireless apparatus 2000 includes a processor 2010, a memory 2020, and a radio frequency (RF) unit 2030.

The processor 2010 performs the proposed functions, processes and/or methods. The processor 2010 may be configured to transmit and/or receive the UE traffic steering preference information. The processor 2010 may be configured so that the UE traffic steering preference information indicates the traffic steering rule preferred by the wireless apparatus. The processor 2010 may be configured to transmit and/or receive preset traffic steering information based on the UE traffic steering preference information. The processor 2010 may perform the traffic steering evaluation based on the traffic steering information to perform the traffic steering. The processor 2010 may be configured to implement the embodiment of the present invention with reference to FIGS. 14 to 19.

The RF unit 2030 is connected to the processor 2010, and sends and receives radio signals. The RF unit 2030 may include at least one RF unit for 3GPP based access network communication and non-3GPP based access network communication.

The processor 2010 may include Application-Specific Integrated Circuits (ASICs), other chipsets, logic circuits, and/or data processors. FIG. 19 illustrates that a single processor 2010 controls and manages all RF units for each access network communication. Each RF unit for each access network communication is functionally coupled with each processor.

The memory 2020 may include Read-Only Memory (ROM), Random Access Memory (RAM), flash memory, memory cards, storage media and/or other storage devices. The RF unit 2030 may include a baseband circuit for processing a radio signal. When the above-described embodiment is implemented in software, the above-described scheme may be implemented using a module (process or function) which performs the above function. The module may be stored in the memory 2020 and executed by the processor 2010. The memory 2020 may be disposed to the processor 2010 internally or externally and connected to the processor 2010 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a traffic steering in a wireless communication system, the method performed by a user equipment (UE) and comprising:
    transmitting, to a first access network, UE traffic steering preference information, wherein the UE traffic steering preference information indicates whether the UE prefers a first traffic steering rule to a second traffic steering rule;
    receiving, from the first access network, traffic steering information, wherein the traffic steering information is configured based on the UE traffic steering preference information;
    evaluating the traffic steering using at least one of the first traffic steering rule and the second traffic steering rule based on the traffic steering information,
    wherein the first traffic steering rule is configured by access network discovery and selection functions (ANDSF), and the second traffic steering rule is configured by the first access network; and
    performing the traffic steering between the first access network and a second access network based on the result of the evaluation of the traffic steering,
    wherein, when the UE traffic steering preference information indicates that the UE prefers the first traffic steering rule to the second traffic steering rule and the ANDSF is an enhanced ANDSF comprising at least one ANDSF management object (MO), the traffic steering information includes information for the second traffic steering rule, and
    wherein, when the UE traffic steering preference information indicates that the UE prefers the first traffic steering rule to the second traffic steering rule and the ANDSF is a legacy ANDSF not comprising the at least one ANDSF MO, the traffic steering information does not include the information for the second traffic steering rule.

2. The method of claim 1, wherein when the UE traffic steering preference information indicates that the UE prefers the second traffic steering rule to the first traffic steering rule, the UE traffic steering preference information includes the first traffic steering rule.

3. The method of claim 2, further comprising performing a measurement with respect to the first access network and the second access network when the UE traffic steering preference information indicates that the UE prefers the second traffic steering rule to the first traffic steering rule,
    wherein the traffic steering is performed based on a result of the measurement and the second traffic steering rule.

4. The method of claim 1, further comprising configuring the first traffic steering rule.

5. The method of claim 1, further comprising updating the first traffic steering rule when at least one rule parameter associated with the second traffic steering rule corresponds to the at least one ANDSF MO.

6. The method of claim 5, further comprising performing a measurement with respect to the first access network and the second access network to acquire a measurement result,
    wherein the evaluating of the traffic steering is performed based on the measurement result and the updated first traffic steering rule.

7. The method of claim 1, wherein when the UE traffic steering preference information indicates that the UE prefers the first traffic steering rule to the second traffic steering rule and the ANDSF is a legacy ANDSF which does not comprise the at least one ANDSF management object (MO), the evaluating of the traffic steering is performed based on the first traffic steering rule.

8. The method of claim 1, wherein the first access network is a long term evolution (LTE) based access network, and the second access network is a wireless local area network (WLAN) based access network.

9. A wireless apparatus operating in a wireless communication system, the wireless apparatus comprises:
    a radio frequency (RF) unit that sends and receives radio signals; and
    a processor that is functionally coupled to the RF unit, wherein the processor:
    controls the RF unit to transmit, to a first access network, UE traffic steering preference information,
    wherein the UE traffic steering preference information indicates whether the UE prefers a first traffic steering rule to a second traffic steering rule,
    controls the RF unit to receive, from the first access network, traffic steering information,
    wherein the traffic steering information is configured based on the UE traffic steering preference information,
    evaluates the traffic steering using at least one of the first traffic steering rule and the second traffic steering rule based on the traffic steering information,
    wherein the first traffic steering rule is configured by access network discovery and selection functions (ANDSF), and the second traffic steering rule is configured by the first access network, and
    performs the traffic steering between the first access network and a second access network based on the result of the evaluation of the traffic steering,
    wherein, when the UE traffic steering preference information indicates that the UE prefers the first traffic steering rule to the second traffic steering rule and the ANDSF is an enhanced ANDSF comprising at least one ANDSF management object (MO), the traffic steering information includes information for the second traffic steering rule, and
    wherein, when the UE traffic steering preference information indicates that the UE prefers the first traffic steering rule to the second traffic steering rule and the ANDSF is a legacy ANDSF not comprising the at least one ANDSF MO, the traffic steering information does not include the information for the second traffic steering rule.

\* \* \* \* \*